US011769006B2

(12) United States Patent
Shekhar et al.

(10) Patent No.: US 11,769,006 B2
(45) Date of Patent: Sep. 26, 2023

(54) PARSING AND REFLOWING INFOGRAPHICS USING STRUCTURED LISTS AND GROUPS

(71) Applicant: Adobe Inc., San Jose, CA (US)

(72) Inventors: Sumit Shekhar, Bengaluru (IN); Zoya Bylinskii, Cambridge, MA (US); Tushar Gurjar, Jaipur (IN); Ritwick Chaudhry, Chandigarh (IN); Ayush Goyal, Sikandrabad (IN)

(73) Assignee: Adobe Inc., San Jose, CA (US)

( * ) Notice: Subject to any disclaimer, the term of this patent is extended or adjusted under 35 U.S.C. 154(b) by 409 days.

(21) Appl. No.: 16/929,903

(22) Filed: Jul. 15, 2020

(65) Prior Publication Data

US 2022/0019735 A1 Jan. 20, 2022

(51) Int. Cl.
| | |
|---|---|
| *G06F 40/205* | (2020.01) |
| *G06F 16/9538* | (2019.01) |
| *G06F 16/9032* | (2019.01) |
| *G06N 20/00* | (2019.01) |

(52) U.S. Cl.
CPC ...... *G06F 40/205* (2020.01); *G06F 16/90332* (2019.01); *G06F 16/9538* (2019.01); *G06N 20/00* (2019.01)

(58) Field of Classification Search
CPC .............. G06F 40/205; G06F 16/9538; G06F 16/90332; G06N 20/00
See application file for complete search history.

(56) References Cited

U.S. PATENT DOCUMENTS

| | | | |
|---|---|---|---|
| 10,713,794 B1 * | 7/2020 | He | G06V 10/764 |
| 2003/0118087 A1 * | 6/2003 | Goldthwaite | G06F 16/954 |
| | | | 707/E17.112 |
| 2004/0064455 A1 * | 4/2004 | Rosenzweig | G06T 11/60 |

OTHER PUBLICATIONS

Anthony, Icons Handle With Care, 2017, Qlik Blog, whole document (Year: 2017).*
Smiciklas, Mark. "The Power of Infographics: Using Pictures to Communicate and Connect with Your Audiences." (2012).
Yang, Xiao, et al. "Learning to extract semantic structure from documents using multimodal fully convolutional neural networks." Proceedings of the IEEE Conference on Computer Vision and Pattern Recognition. 2017.

(Continued)

*Primary Examiner* — Sonia L Gay
(74) *Attorney, Agent, or Firm* — Keller Preece PLLC

(57) ABSTRACT

This disclosure describes methods, systems, and non-transitory computer readable media for automatically parsing infographics into segments corresponding to structured groups or lists and displaying the identified segments or reflowing the segments into various computing tasks. For example, the disclosed systems may utilize a novel infographic grouping taxonomy and annotation system to group elements within infographics. The disclosed systems can train and apply a machine-learning-detection model to generate infographic segments according to the infographic grouping taxonomy. By generating infographic segments, the disclosed systems can facilitate computing tasks, such as converting infographics into digital presentation graphics (e.g., slide carousels), reflow the infographic into query-and-response models, perform search functions, or other computational tasks.

20 Claims, 17 Drawing Sheets

(56) References Cited

OTHER PUBLICATIONS

Zhang, Yunke, et al. "Layout Style Modeling for Automating Banner Design." Proceedings of the on Thematic Workshops of ACM Multimedia 2017. ACM, 2017.
Bylinskii, Z., Alsheikh, S., Madan, S., Recasens, A., Zhong, K., Pfister, H., . . . & Oliva, A. (2017). Understanding infographics through textual and visual tag prediction. arXiv preprint arXiv:1709.09215.
Chen, Z., Wang, Y., Wang, Q., & Qu, H. (2019). Towards Automated Infographic Design: Deep Learning-based Auto-Extraction of Extensible Timeline. IEEE transactions on visualization and computer graphics.

* cited by examiner

PARSING AND REFLOWING INFOGRAPHICS USING STRUCTURED LISTS AND GROUPS

BACKGROUND

In recent years, hardware and software platforms have been developed to generate and share informational computer graphics that include groupings of graphics and text in various layouts. Such infographics or informational computer graphics often include groups of graphics and text to communicate different concepts, such as by grouping a graph or an image alongside explanatory text corresponding to the graph. As conventional graphic systems have generated and distributed infographics across news media, educational institutions, and various other contexts, infographics can vary widely in style, font, graphic, and layout. In part because they exhibit such wide variety of graphic-text groupings, analyzing and parsing infographics has proven a complex computational task for conventional graphic-analysis systems.

Conventional graphics-analysis or document-analysis systems cannot parse infographics. At best, such conventional systems inaccurately and inefficiently analyze isolated components from infographics. For instance, conventional systems often cannot identify varying styles, fonts, graphics, and layouts present across all types of infographics, causing some such systems to misidentify important components or groupings from infographics. By contrast, some conventional systems separately use one model to analyze textual regions and another model to analyze graphics or figures. But such conventional systems cannot (and have repeatedly failed to) identify correlations between text and graphical regions from infographics and can produce only a disconnected textual or graphic recognition of separate regions.

In addition to failing to recognize related portions of infographics, conventional systems often cannot analyze whole infographics because they parse only narrow or specific categories of graphics. For instance, some conventional graphics-analysis systems attempt to specifically parse timeline graphics. Other conventional systems focus on reflowing banner ads and structurally similar graphics. Yet other conventional systems focus on specific, isolated portions of infographics. For instance, some conventional graphics-analysis systems attempt to parse visual icons within infographics to predict the topic matter of the infographic. Both collectively and individually, conventional systems cannot holistically process complex infographics comprising a multitude of text and graphic components in complex layouts.

Because existing systems cannot process infographics, conventional graphics-analysis and document-analysis systems often only provide displays or tools for inefficient review. More specifically, conventional systems often require users to load, view, and manually identify relevant information within an infographic. Because some infographics are so large, some conventional systems require users to scroll or flip through several pages of infographics to identify relevant information. Additionally, while some conventional image editing systems can image crop or capture a snapshot of individual sections from infographics based on user selections, such systems can often only present cropped sections without the computational tools for further analysis.

Beyond failing to analyze either portions or entire infographics, some conventional graphics-analysis or document-analysis systems often possess only inflexible and limited applications for infographics. In particular, conventional infographic analysis systems are often limited to analyzing graphics or documents of a particular layout, type, or style. For instance, some existing graphics-analysis systems can only process graphics from infographics by generating raster images but cannot reflow such raster images in downstream applications. Some conventional systems may attempt to overcome this limitation by applying Optical Character Recognition ("OCR") algorithms to infographics. But OCR algorithms merely parses text but not graphics.

SUMMARY

This disclosure describes one or more embodiments of systems, methods, and non-transitory computer readable storage media that solve one or more of the foregoing problems and provide other benefits. For example, in some embodiments, the disclosed systems can automatically parse an infographic into segments corresponding to structured groups or lists and either display the segments on a computing device or reflow the segments into other computing tasks. In certain implementations, the disclosed system utilizes a new infographic grouping taxonomy and annotation system to label and group infographics. Based on the infographic grouping taxonomy and annotation system, the disclosed system may tune or apply a machine-learning-detection model to parse infographics into structured segments. By generating infographic segments, the disclosed system can convert infographics into presentation graphics (e.g., slide carousels) or other visual representations to facilitate the reflow of infographics into query-and-response models or other computational tasks.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

This disclosure describes one or more embodiments of an infographic parsing system with additional specificity and detail by referencing the accompanying figures. The following paragraphs briefly describe those figures.

DETAILED DESCRIPTION

Figure 1:
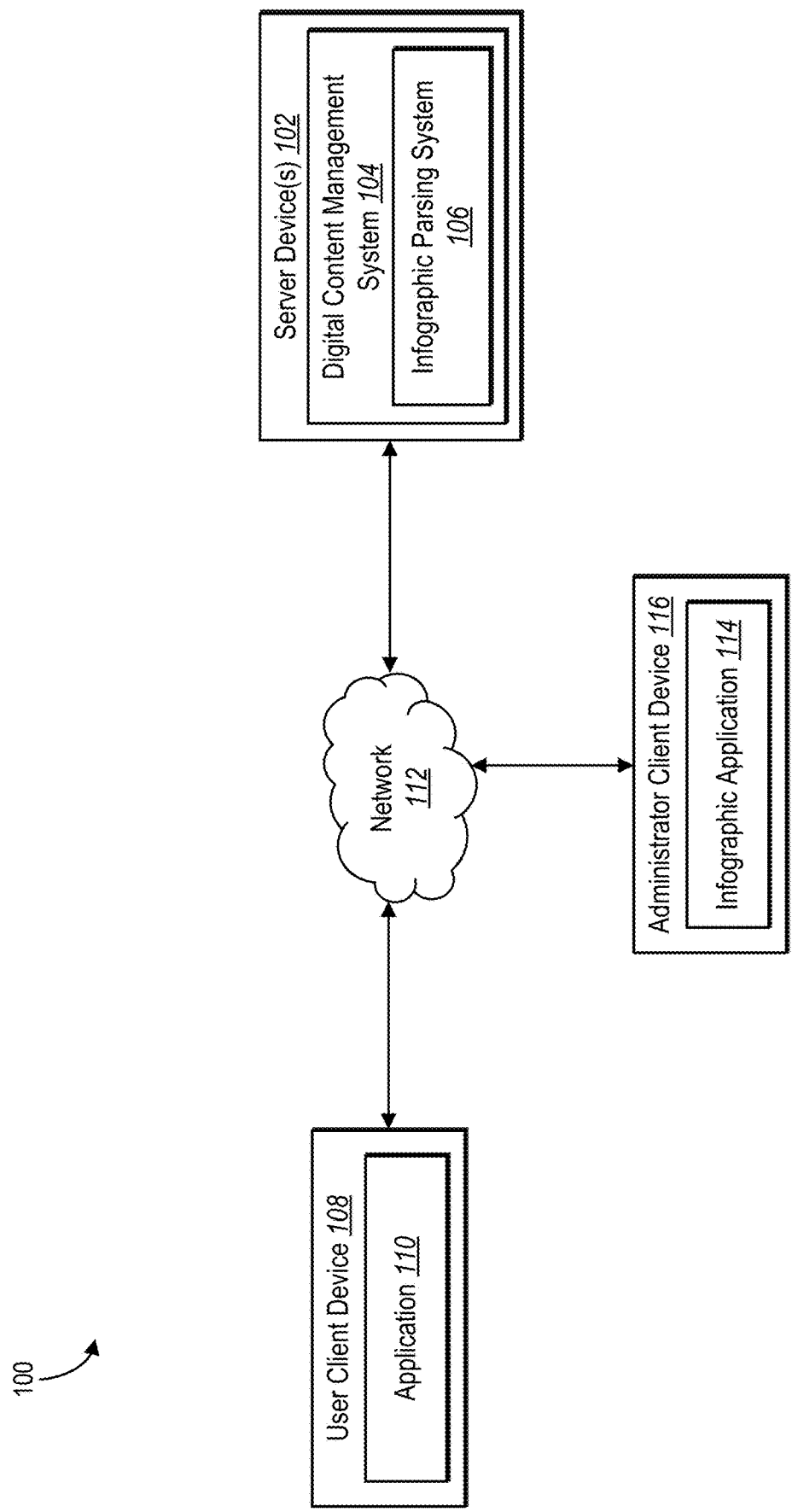
FIG. 1 illustrates an environment in which an infographic parsing system can operate in accordance with one or more embodiments of the present disclosure.

This disclosure describes one or more embodiments of an infographic parsing system that efficiently and accurately parses an infographic into segments corresponding to structured groups or lists utilizing a machine-learning-detection model. In particular, the infographic parsing system can partition long or complex infographics into smaller overlapping frames or windows to feed the machine-learning-detection model, such as a single-shot-multibox detector. Based on the overlapping windows, the machine-learning-detection model can identify candidate infographic segments comprising text elements and/or graphic elements and generate corresponding confidence values for the infographic segments. Based on the confidence values, the infographic parsing system can identify structured infographic segments that include one or both of related text and graphic elements. The infographic parsing system can further provide the structured infographic segments for display via a graphical user interface at a computing device.

For example, in some embodiments, the infographic parsing system receives an infographic comprising text elements and graphic elements. Using a machine-learning-detection model, the infographic parsing system generates candidate infographic segments comprising one or more text elements or graphic elements and segment-confidence values indicating a probability that particular candidate infographic segments comprise discrete components from the infographic corresponding to a list or a group. Based on the segment-confidence values, the infographic parsing system selects infographic segments comprising one or more related text elements or graphic elements corresponding to particular lists or particular groups within the infographic. The infographic parsing system can further provide the infographic segments for display by a computing device. In one such case, the infographic parsing system converts the infographic segments into a slide carousel or other digital presentation graphics.

As just mentioned, in some cases, the infographic parsing system generates a set of segment-confidence values for each candidate infographic segment. The infographic parsing system may utilize segment-confidence values for candidate infographic segments to select final infographic segments. For example, the infographic parsing system may designate candidate infographic segments associated with the highest segment-confidence values as infographic segments. In particular, the infographic parsing system can generate a set of segment-confidence values that indicate a set of probabilities that a particular candidate infographic segment comprises a list or a group of text elements or graphic elements according to an infographic grouping taxonomy.

After selecting infographic segments based on segment-confidence values, in some cases, the infographic parsing system converts the infographic segments into slides or other digital presentation graphics that depict a discrete group or list from the infographic. For example, the infographic parsing system can take each of the automatically detected infographic segments and place them within uniformly sized slides. To generate such slides, the infographic parsing system can refine the borders of slides, center the information from the infographic segments, and fill in remaining portions of the slides with color. Thus, in some embodiments, the infographic parsing system can generate a uniformly sized slide deck—each slide depicting contextually related infographic segments from a parent infographic.

In addition to generating slides or other digital presentation graphics, in certain implementations, the infographic parsing system utilizes the infographic segments in presentation-graphic form (or otherwise) to facilitate user queries or facilitate other computational tasks that retrieve information from the infographic segments. In at least one embodiment, the infographic parsing system creates and provides a query-response model to answer questions using information from infographics. For instance, by using a BERT-based query-response model, the infographic parsing system can receive plain language questions and generate predicted answers based on information extracted from the infographic segments. In addition to providing textual answers to the received questions, the infographic parsing system can display the infographic segment from which the infographic parsing system derived the textual answers.

As indicated above, in some embodiments, the infographic parsing system can train a machine-learning-detection model to generate infographic segments according to a novel infographic grouping taxonomy. For instance, the infographic parsing system can train the machine-learning-detection model to organize text and/or graphics from an infographic into categories and subcategories according to the infographic grouping taxonomy. In particular, the infographic parsing system can collect training data by providing, within a graphical user interface of a client device, a sample infographic together with annotation labels according to the infographic grouping taxonomy. By receiving an association of particular annotations with sample infographic elements via such an annotation graphical user interface, the infographic parsing system determines ground-truth annotations and ground-truth location identifiers for particular sample infographics.

As just suggested, the infographic parsing system can provide an annotation tool at a client device. Generally, the annotation tool facilitates associating annotations with text and graphic elements in a sample infographic. In particular, the infographic parsing system can generate text and graphic bounding boxes for text and graphic elements in a sample infographic. The infographic parsing system can receive selections of bounding boxes and selections of annotation labels to associate annotation labels with particular text and graphic elements. Furthermore, the infographic parsing system can export the annotations as a nested list hierarchy and provide the nested list hierarchy for display at a client device.

Upon identifying ground-truth data for a sample infographic, the infographic parsing system may train a machine-learning-detection model to accurately identify infographic segments by comparing ground-truth annotations with predicted infographic segments. In particular, the infographic parsing system can partition a sample infographic into overlapping sample infographic frames. The infographic parsing system can further utilize the machine-learning detection model to generate predicted infographic segments comprising one or both of (i) predicted annotations identifying predicted lists or groups of text elements or graphic elements within the predicted infographic segments and (ii) predicted location identifiers identifying locations of the predicted infographic segments within the sample infographic. The infographic parsing system can further compare the predicted location identifiers to ground-truth location identifiers and compare the predicted annotations to the ground-truth annotations. Based on such ground-truth comparisons, the infographic parsing system modifies machine-learning parameters of the machine-learning-detection model.

As suggested above, the infographic parsing system also provides several technical benefits relative to conventional graphics-analysis systems or conventional document-analysis systems. Unlike conventional systems, the infographic parsing system accurately parses and identifies segments of an infographic. In particular, the infographic parsing system utilizes a machine-learning-detection model to intelligently identify groups or lists of text and/or graphics from an infographic. By generating candidate infographic segments from an infographic and corresponding segment-confidence values, the infographic parsing system can utilize the machine-learning-detection model to accurately identify segments comprising contextually related elements from the infographic. Because the disclosed system accurately identifies segments comprising related elements within an infographic, the infographic parsing system can also accurately identify grouped text or graphics to respond to queries in downstream applications, such as question and answer applications.

In addition to accurate parsing, the infographic parsing system efficiently automates a detection and parsing task that conventional systems cannot perform. Indeed, the infographic parsing system utilizes an unconventional ordered combination of acts to partition an infographic into candidate infographic segments and generate segment-confidences values for such candidates to quickly identify logical groupings or lists within the infographic. Rather than display portions or a full layout of infographics for a user to view and identify desired information, as conventional systems do, the infographic parsing system can perform an ordered combination of acts in a new form of artificial intelligence. For instance, the infographic parsing system can intelligently parse an infographic by partitioning the infographic into overlapping infographic frames, generating candidate infographic segments and corresponding candidate-segment values utilizing a machine-learning-detection model, and selecting infographic segments from among the candidates based on the segment-confidence values. As a further example, in some embodiments, the infographic parsing system can intelligently train a machine-learning-detection model to parse infographics by partitioning a sample infographic into overlapping sample infographic frames, generating predicted infographic segments and predicted segment-confidence values utilizing the machine-learning-detection model, and comparing the predicted infographic segments to ground-truth annotations for the sample infographic.

The infographic parsing system can also flexibly parse a variety of different infographics and expand the utility of a parsed infographic into downstream applications. In particular, while conventional systems are often limited to analyzing documents or graphics of particular layouts, types, and/or styles, the infographic parsing system can flexibly apply the machine-learning-detection model to a variety of types and styles of infographics. By using an annotation user interface with annotation labels according to a new infographic grouping taxonomy, for instance, the infographic parsing system can customize training data used to train a machine-learning-detection model to recognize and parse a variety of infographics and constituent groupings or lists. As described further below, the infographic parsing system can customize predicted infographic segments to particular types of infographics or to particular users based on one or both of ground-truth annotations and ground-truth location identifiers attached to sample infographics by an annotation tool. Furthermore, the infographic parsing system may flexibly utilize the generated infographic segments in downstream applications. For instance, the infographic parsing system can reflow the infographic segments in a meaningful manner, conduct searches, and perform additional operations as will be described herein.

As illustrated by the foregoing discussion, the present disclosure utilizes a variety of terms to describe features and benefits of the infographic parsing system. Additional detail is hereafter provided regarding the meaning of these terms as used in this disclosure. For example, as used herein, the term "infographic" refers to a document comprising groupings or lists of related graphics and text. In particular, an infographic can comprise a collection of graphic elements and text elements in which at least one textual element corresponds to at least one graphic. For example, infographics can include brochures, menus, manuals, and other information visualization designs comprising groupings of graphics and text in various layouts.

As used herein, the term "graphic element" refers to a graphical item or image displayable on a computing device or storable as data. In particular, a graphic element comprises a visual object displayed as part of an infographic. For example, a graphic element may comprise an icon, chart, color wheel, diagram, symbol, table, or other type of graphical visualization. Relatedly, as used herein, the term "text element" refers to writing characters, glyphs, letters, or numbers. In particular, a text element comprises a collection of one or more characters, glyphs, numbers, or words within a defined area of an infographic. For example, a text element can comprise a written label, title, description, or any other type of textual component of an infographic.

As further used herein, the term "machine-learning-detection model" refers to a computer representation that can be tuned (e.g., trained) based on inputs to approximate unknown functions to detect components of an infographic. For instance, a machine-learning-detection model can include a model that utilizes algorithms to learn from, and make predictions on, known data by analyzing the known data to learn to generate outputs that identify components of an infographic. In particular, a machine-learning-detection model includes neural networks that generate infographic segments from an input infographic. In some cases, a machine-learning-detection model can refer to a single shot panel detector for generating infographic segments and segment-confidence values.

As used herein, the term "infographic segments" refers to discrete parts or components of an infographic. In particular, an infographic segment can comprise one or more of text elements and/or graphic elements that are contextually related. For instance, an infographic segment can comprise text elements and/or graphic elements that are directed to the same point or topic. As a further example, an infographic segment can comprise an image and text describing the image.

Relatedly, the term "candidate infographic segment" refers to potential infographic segments or regions of an infographic potentially comprising infographic segments. In particular, candidate infographic segments comprise text and graphic elements that may be contextually related to each other. For example, the infographic parsing system may select an infographic segment from a group of candidate infographic segments.

As used herein, the term "infographic frame" refers to a section or portion of an infographic. In particular, an infographic frame comprises a portion of an infographic enclosed within defined borders. Two or more infographic frames may overlap. More specifically, all or part of the portion within the borders of a first infographic frame can be included within the borders of a second infographic frame. For example, when the infographic parsing system generates two infographic frames from an infographic, the first infographic frame can include a top portion of the infographic while excluding a bottom portion of the infographic. The second infographic frame can overlap with a portion of the first infographic frame while also including the bottom portion of the infographic.

As further used herein, the term "segment-confidence values" refers to a quantitative measurement reflecting a likelihood or probability that an infographic segment comprises related graphic elements and/or text elements. In particular, segment-confidence values indicate the probability that a particular candidate infographic segment comprises a discrete component from the infographic. For instance, the segment-confidence values can comprise numerical values that reflect a percentage probability that any given candidate infographic segment contains a discrete component from the infographic corresponding to a list or a group from an infographic.

As used herein, the term "group" refers to a collection of related items from an infographic. In particular, a group can refer to a unit of related text elements and/or graphic elements from an infographic. For example, a group might include a graphic element comprising a segment of a pie chart as well as a text element "40%" indicating that the segment of the pie chart comprises 40% of the whole.

As used herein, the term "list" refers to two or more connected items arranged together in an infographic. In particular, a list refers to a structured arrangement of list elements in an infographic, such as elements arranged as bullet points, ordered instructions, or menu items. A list element can comprise individual text and/or graphic elements or a group of elements. In at least one embodiment, a list element comprises a group including related text elements and/or graphic elements. The term "list" can accordingly refer to ordered lists or unordered lists. For instance, ordered lists include list elements in a particular order, such as a set of numbered items or ordered instructions comprising text and accompanying figures or diagrams. Unordered lists comprise list elements not in any particular order. For example, a list may comprise component list elements that together form a pie chart, a set of statistics comprising numbers and text, or an unordered list of menu items comprising pictures and text descriptions. More specifically, a list element can comprise a group comprising a graphic element representing a portion of a pie chart and a text element comprising a graphic segment percentage.

As indicated above, in certain implementations, the infographic parsing system trains a machine-learning-detection model to identify infographic segments from an infographic based on predicted segment confidence values. This disclosure uses the terms "sample infographic," "sample graphic element," and "sample text element" respectively for an infographic, graphic element, and text element used in training such a model; the term "predicted infographic segment" for an infographic segment identified in testing or tuning the model; the term "predicted segment-confidence value" for segment-confidence values generated in testing or tuning the model; the term "candidate segment" or "sample candidate infographic segment" for a candidate infographic segment identified in testing or tuning the model; and the terms "ground-truth list" and "ground-truth group" to respectively for an observed list and an observed group from a sample infographic in training.

As used herein, the term "ground-truth annotation" refers to a ground-truth label associated with a graphic element or a text element (or combination thereof) within an infographic. In particular, ground-truth annotation can include a label that indicates the place of an element within a list hierarchy in training data. Ground-truth annotations include user-entered labels for text and graphic elements within an infographic. For example, a ground-truth annotation can indicate that a text or graphic element is part of a group of related elements, an individual item, a list element within an ordered list, or a list element within an unordered list.

As used herein, the term "ground-truth location identifier" refers to data indicating a location of a graphic element or a text element (or a combination thereof) within an infographic. In particular, a ground-truth location identifier can include a location of text and/or graphic elements that have been associated with a ground-truth annotation within an infographic. For example, ground-truth location identifiers can refer to dimensions of and coordinates of bounding boxes around a text element, a graphic element, or a group of elements associated with a ground-truth annotation.

As further used herein, the term "infographic grouping taxonomy" refers to a system of classification for grouping elements within an infographic. In particular, the infographic grouping taxonomy defines a method for organizing text and graphic elements of an infographic within a hierarchical list structure. For example, according to the infographic grouping taxonomy, elements within any infographic can be organized into related groups that comprise list elements within a nested list and group structure. In some cases, the infographic grouping taxonomy assumes that every infographic, regardless of style, type, size, etc., can be decomposed into a tree composed of a set of nested lists.

The following disclosure provides additional detail regarding the infographic parsing system in relation to illustrative figures portraying example embodiments and implementations of the infographic parsing system. For example, FIG. 1 illustrates a schematic diagram of a system environment (or "environment) 100 in which an infographic parsing system 106 can operate in accordance with one or more embodiments. As illustrated, the environment 100 includes one or more server device(s) 102 connected to a user client device 108 and an administrator client device 116 via a network 112. While FIG. 1 shows an embodiment of the infographic parsing system 106, alternative embodiments and configurations are possible.

As further shown in FIG. 1, the server device(s) 102, the user client device 108, and the administrator client device 116 are connected via the network 112. Each of the components of the environment 100 can communicate via the network 112. The network 112 comprises any suitable network over which computing devices can communicate. Example networks are discussed in additional detail below in relation to FIG. 12.

As illustrated in FIG. 1, the server device(s) 102 may generate, store, receive, and transmit digital content including software hosted at the server device(s) 102, digital video, digital images, digital audio, digital infographics, metadata, etc. In particular, the server device(s) 102 can provide or support various graphical user interfaces and digital content, including infographics, to devices, such as the user client device 108 and the administrator client device 116 via the network 112. For example, the server device(s) 102 may receive and analyze infographics from the administrator client device 116 and/or the user client device 108. Furthermore, the server device(s) 102 can send infographic segments to the user client device 108, and/or the administrator client device 116. The server device(s) 102 may also generate and send digital presentation graphics associated with the infographic segments to the user client device 108 and/or the administrator client device 116. In some embodiments, the server device(s) 102 comprise a distributed server where the server device(s) 102 include a number of server devices distributed across the network 112 and located in different physical locations. The server device(s) 102 can comprise a content server, an application server, a communication server, a web-hosting server, or a digital content management server.

As further shown in FIG. 1, the server device(s) 102 includes a digital content management system 104. In one or more embodiments, the digital content management system 104 facilitates creating, modifying, analyzing, editing, sharing distributing, and/or managing digital content, including infographics. For example, the digital content management system 104 can store a repository of digital content, including digital images, digital videos, digital graphics, text data, messaging data, and other digital content received from the administrator client device 116. More specifically, the digital content management system 104 can store infographics and infographics data.

As shown, the infographic parsing system 106 can be implemented as part of the digital content management system 104. The infographic parsing system 106 can utilize a machine-learning-detection model to generate infographic segments for input infographics. The infographic parsing system 106 can communicate with the administrator client device 116 and the user client device 108. For example, the infographic parsing system 106 can distribute (e.g., via the network 112) data relating to the infographic segments. For example, the infographic parsing system 106 can receive, from the administrator client device 116, infographics to analyze as well as sample infographics for training the machine-learning-detection model. The infographic parsing system 106 may send, to the administrator client device 116 and/or the user client device 108, infographic segments and digital presentation graphics associated with the infographics.

The infographic parsing system 106 can comprise an application running on the server device(s) 102 or a portion of a software application that can be downloaded from the server device(s) 102. For example, the infographic parsing system 106 can include a web hosting application that allows the user client device 108 and the administrator client device 116 to interact with content hosted on the server device(s) 102. To illustrate, in one or more embodiments, the administrator client device 116 accesses a web page supported by the server device(s) 102.

As shown in FIG. 1, the environment 100 includes the user client device 108. The user client device 108 may comprise various types of client devices. For example, in some embodiments, the user client device 108 includes mobile devices, such as laptops, tablets, mobile telephones, smartphones, etc. In other embodiments, the user client device 108 includes non-mobile devices, such as desktops or servers, or other types of client devices. Additional details with regard to the user client device 108 are discussed below with respect to FIG. 12.

As further illustrated in FIG. 1, the user client device 108 includes an application 110. The application 110 may be a web application or a native application on the user client device 108 (e.g., a mobile application, a desktop application). The application 110 can interface with the infographic parsing system 106 to provide digital content to the server device(s) 102, and to present (e.g., display) digital content received from the server device(s) 102. Indeed, the application 110 can present one or more graphical user interfaces and various applications for presenting infographic segments. For instance, the application 110 can present applications including a question and answer application to receive questions at the user client device 108 and present infographic-based answers. Additionally, the application 110 can present digital presentation graphics that display infographic segments.

As further shown in FIG. 1, the environment 100 includes the administrator client device 116. The administrator client device 116 can send inputs to the infographic parsing system 106 for adjusting parameters of the machine-learning-detection model. For example, the administrator client device 116 can send, to the infographic parsing system 106, sample infographics, and ground-truth data for training the machine-learning-detection model. In one embodiment, the administrator client device 116 can present, to an administrator, options for entering ground-truth data including ground-truth location identifiers and ground-truth annotations. In at least one embodiment, the administrator client device 116 is involved in training the machine-learning-detection model while the user client device 108 is involved in the application stage for downstream applications. For instance, the administrator client device 116 can present the annotation graphical user interface for associating annotation labels with infographic elements. In contrast, the user client device 108 can present graphical user interfaces for operating query-response model and/or other downstream applications.

As illustrated in FIG. 1, the administrator client device 116 includes an infographic application 114. The infographic application 114 may be a web application or a native application on the administrator client device 116 (e.g., a mobile application, a desktop application). The infographic application 114 can interface with the infographic parsing system 106 to provide digital content to the server device(s) 102, and to cause the administrator client device 116 to present (e.g., display) digital content received from the server device(s) 102. Indeed, the infographic application 114 can present options to select sample infographics for training the machine-learning-detection model. Furthermore, the infographic application 114 can present a graphical user interface comprising elements and features for receiving ground-truth location identifiers and ground-truth annotations for the sample infographics. The infographic application 114 may also receive data from the infographic parsing system 106. For instance, the infographic application 114 may receive infographic segments from the infographic parsing system 106.

Although FIG. 1 depicts the infographic parsing system 106 located on the server device(s) 102, in some embodiments, the infographic parsing system 106 may be implemented by (e.g., located entirely or in part) on one or more other components of the environment. For example, the infographic parsing system 106 may be implemented on the user client device 108 or on the administrator client device 116.

In some embodiments, though not illustrated in FIG. 1, the environment 100 may have a different arrangement of components and/or may have a different number or set of components altogether. For example, in one or more embodiments, the environment 100 may exclude the user client device 108 and/or the administrator client device 116. In particular, the infographic parsing system 106 may receive infographics from and send infographic segments to one of the user client device 108 or the administrator client device 116.

Additionally, the administrator client device 116 and the user client device 108 may communicate directly with the infographic parsing system 106, bypassing the network 112. Moreover, the infographic parsing system 106 can include one or more databases housed on the server device(s) 102 or elsewhere in the environment. Further, the infographic parsing system 106 can include one or more machine learning models (e.g., neural networks), and the infographic parsing system 106 can be implemented in a variety of different ways across the server device(s) 102, the network 112, the user client device 108, and the administrator client device 116.

Figure 2A:
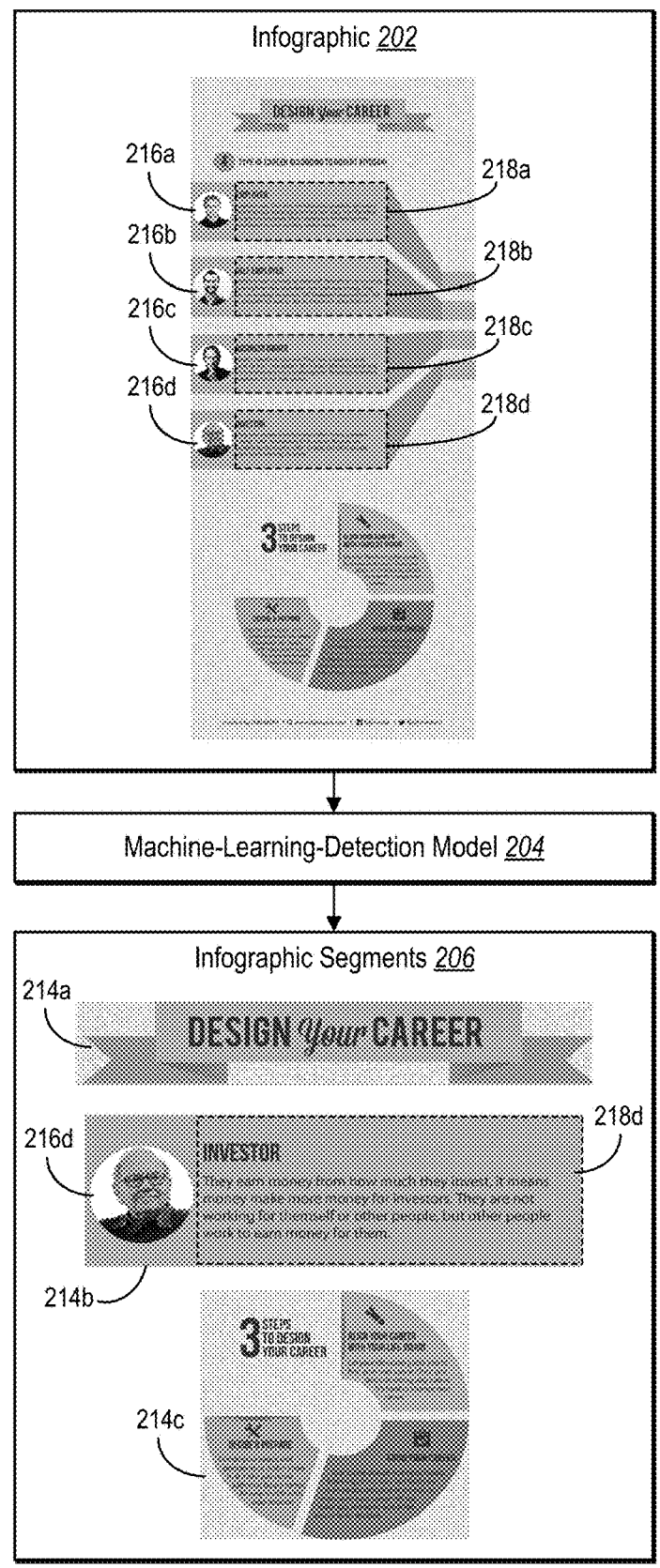
FIGS. 2A-2B illustrate an overview of the infographic parsing system generating and presenting infographic segments in accordance with one or more embodiments of the present disclosure.
Figure 2B:
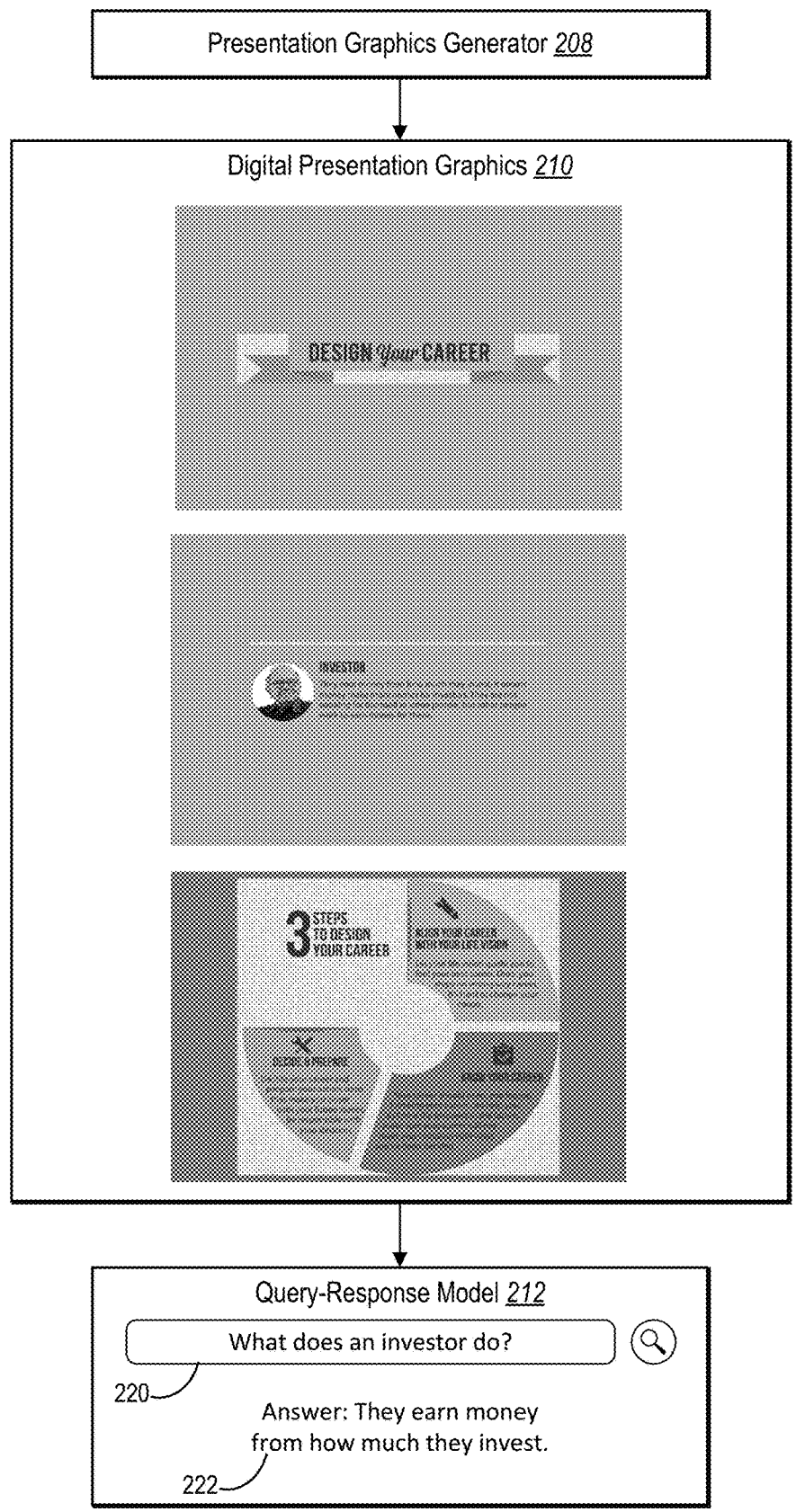

As discussed above, in some embodiments, the infographic parsing system 106 utilizes a machine-learning-detection model to generate infographic segments for an infographic. FIGS. 2A-2B provide an overview of the infographic parsing system 106 identifying infographic segments within an infographic and presenting relevant infographic segments based on a user query in accordance with one or more embodiments. As generally shown in FIG. 2A, the infographic parsing system 106 inputs an infographic 202 into a machine-learning-detection model 204. The machine-learning-detection model 204 parses the infographic 202 and generates infographic segments 206. As generally shown in FIG. 2B, the infographic parsing system 106 inputs the infographic segments 206 into a presentation graphics generator 208 to create digital presentation graphics 210.

Turning back now to FIG. 2A, the infographic parsing system 106 receives the infographic 202. Generally, the infographic parsing system 106 receives the infographic 202 from a client device (e.g., the user client device 108 or the administrator client device 116). As shown, the infographic 202 comprises both graphic elements and text elements. To illustrate, the infographic 202 includes graphic elements 216a-216d as various images. The infographic 202 also includes text elements 218a-218d as text corresponding to each of the graphic elements 216a-216d.

Figure 3:
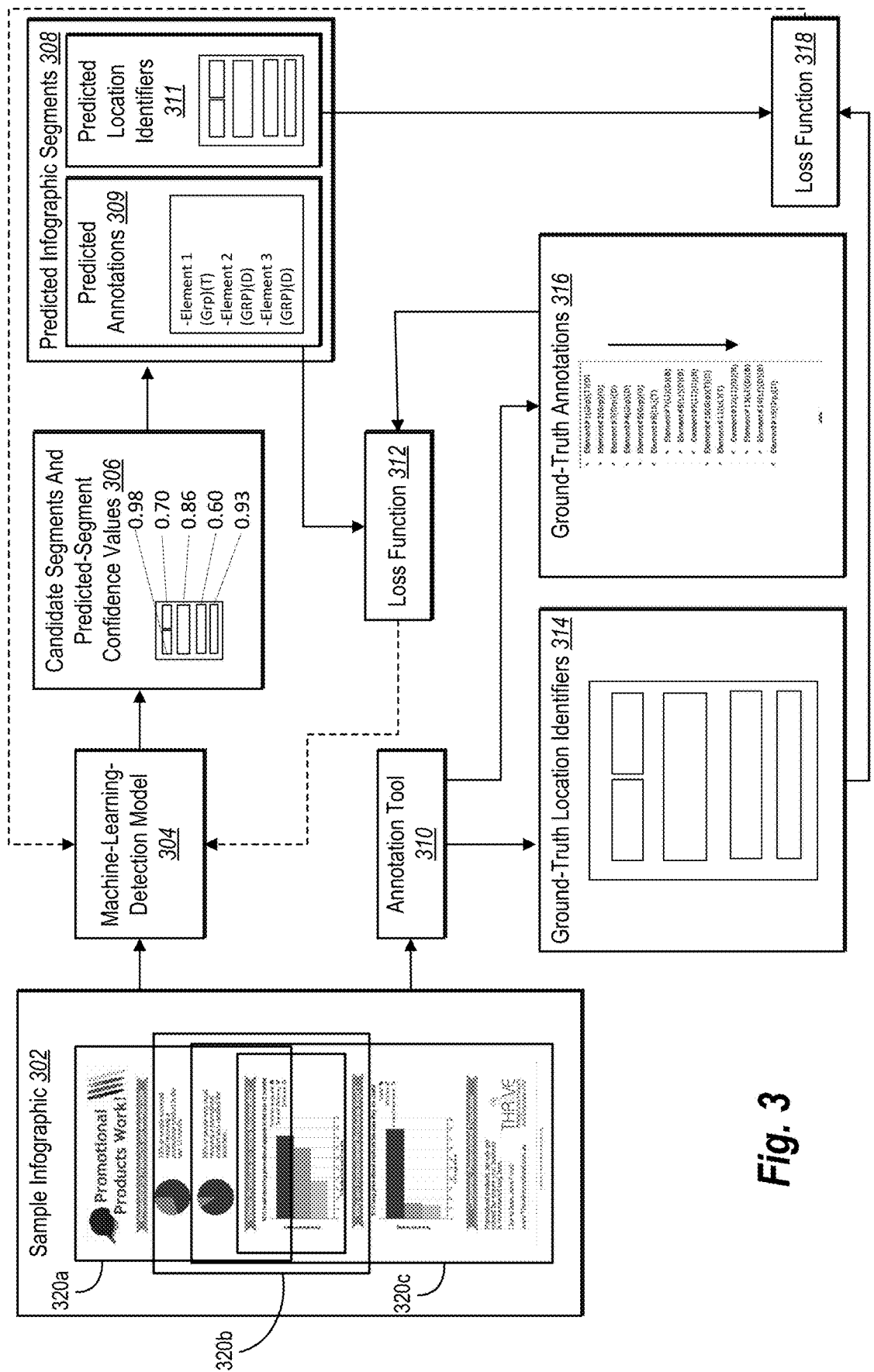
FIG. 3 illustrates a flow diagram demonstrating the infographic parsing system training a machine-learning-detection model in accordance with one or more embodiments of the present disclosure.
Figure 4:
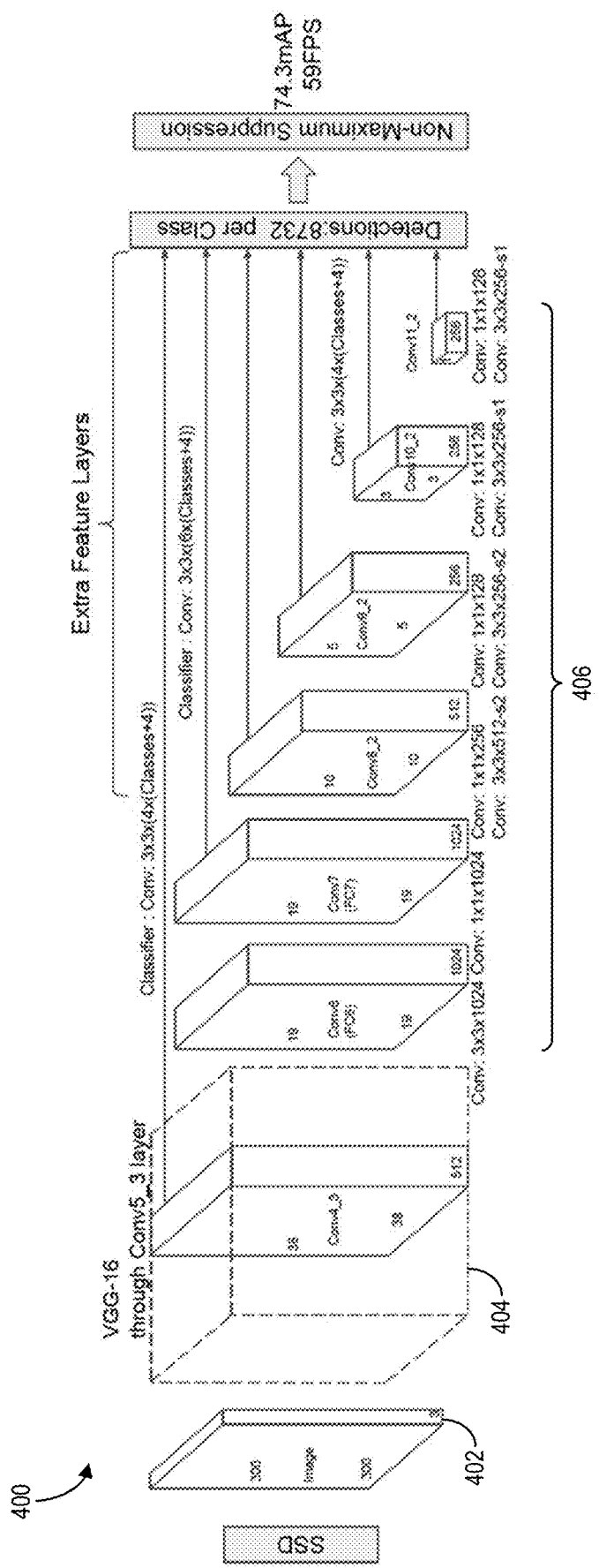
FIG. 4 illustrates an example machine-learning-detection model in accordance with one or more embodiments of the present disclosure.

As further illustrated in FIG. 2A, the infographic parsing system 106 inputs the infographic 202 into the machine-learning-detection model 204. As mentioned previously, the machine-learning-detection model 204 analyzes the infographic 202 to generate infographic segments 206. In particular, the infographic parsing system 106 can utilize the machine-learning-detection model 204 to generate candidate infographic segments and segment-confidence values. The infographic parsing system 106 selects the infographic segments 206 from the candidate infographic segments based on the segment-confidence values. For instance, in at least one embodiment, the infographic parsing system 106 performs non-maximal suppression on the candidate infographic segments to identify candidate infographic segments corresponding to a set of highest segment-confidence values. FIGS. 3-4 and the corresponding discussion provide additional detail regarding the machine-learning-detection model 204 in accordance with one or more embodiments.

As further illustrated in FIG. 2A, the infographic parsing system 106 identifies the infographic segments 206 based on such segment-confidence values from the machine-learning-detection model 204. The infographic segments 206 comprise related text elements or graphic elements corresponding to particular lists or groups within the infographic. For example, as illustrated, the infographic parsing system 106 identifies the infographic segments 214a-214c. To illustrate, the infographic segment 214a comprises a group including a text element "Design Your Career" together with a graphic element of a banner. Additionally, the infographic segment 214b comprises a group including the graphic element 216d together with the text element 218d. Similarly, the infographic segment 214c comprises a group including several text elements and graphic elements.

Figure 9:
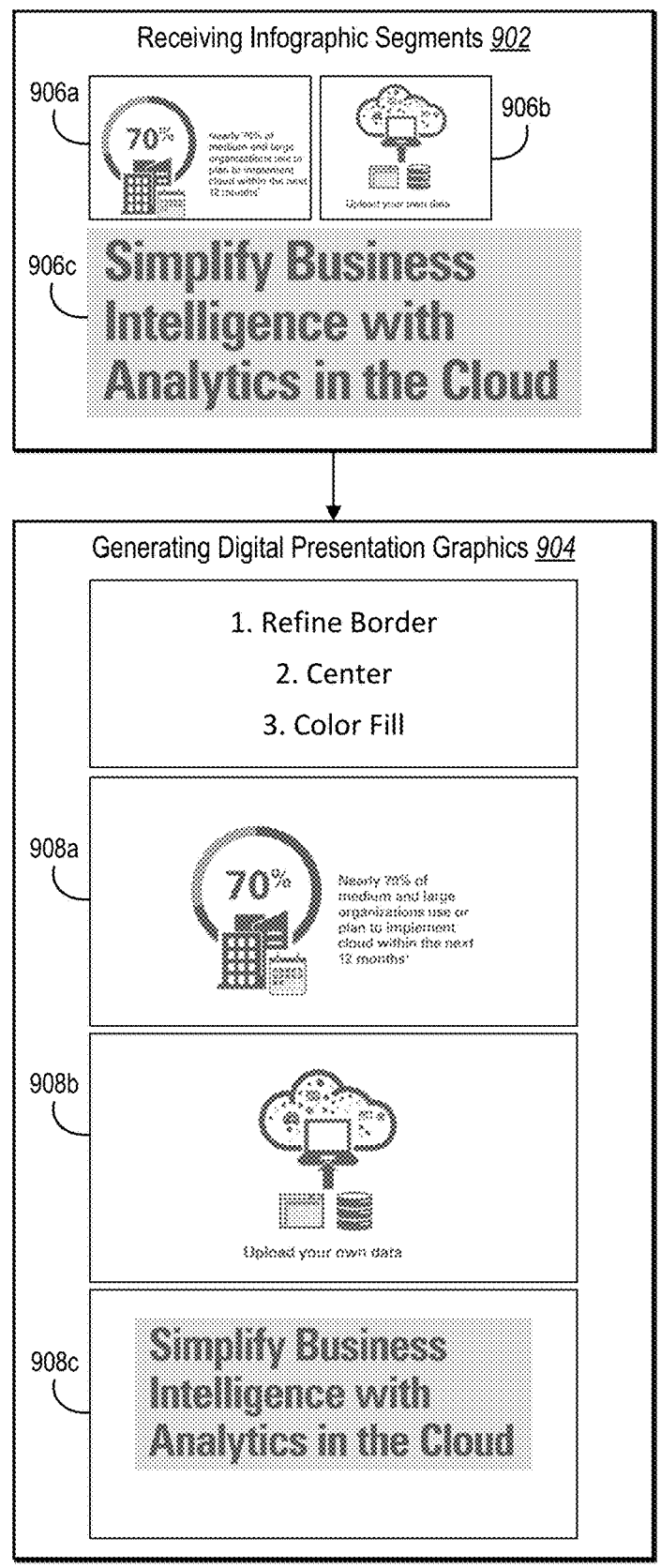
FIG. 9 illustrates the infographic parsing system generating digital presentation graphics in accordance with one or more embodiments of the present disclosure.

As illustrated in FIG. 2B, the infographic parsing system 106 inputs the infographic segments 206 into the presentation graphics generator 208. Generally, the presentation graphics generator 208 performs various operations on infographic segments to generate digital presentation graphics 210 of a uniform size. In at least one embodiment, the presentation graphics generator 208 refines borders of the infographic segments 206, places the infographic segments 206 at the center of fixed sized blank images, and fills the remaining pixels of the image. FIG. 9 and the accompanying discussion provide additional detail regarding how the presentation graphics generator 208 generates digital presentation graphics in accordance with one or more embodiments.

As further indicated by FIG. 2B, the infographic parsing system 106 provides the digital presentation graphics 210 for display. As mentioned, in some embodiments, the digital presentation graphics 210 comprise the infographic segments 206 on fixed-size images. For instance, the digital presentation graphics 210 can comprise a deck of slides that the infographic parsing system 106 can present to the user. In at least one embodiment, the infographic parsing system 106 provides a series of the digital presentation graphics 210 presented in order at a client device. Thus, a user can view contextually relevant infographic segments in or out of order.

As suggested above, in some embodiments, the infographic parsing system 106 utilizes the digital presentation graphics 210 as inputs into various applications for viewing and/or reflowing groups within an infographic. For example, instead of simply presenting the digital presentation graphics 210 in order as included in the infographic 202, the infographic parsing system 106 may reorganize the digital presentation graphics 210 according to the underlying list or groups. For instance, the infographic parsing system 106 can maintain the order of infographic segments if they are part of an ordered list. The infographic parsing system 106 may also scramble the order of infographic segments if the infographic segments are part of an unordered list.

For example, the infographic parsing system 106 can reflow the infographic segments as part of a query-response model 212. In at least one embodiment, the infographic parsing system 106 facilitates identifying and presenting relevant portions of the infographic 202 via the query-response model 212. For instance, the infographic parsing system 106 can receive a query 220 for information from the infographic 202. The infographic parsing system 106 can utilize the query-response model 212 to identify an infographic segment comprising a textual segment relevant to the query 220. Based on identifying a relevant infographic segment, the infographic parsing system 106 provides a textual segment 222 from the infographic segment as a response to the query 220. For example, and as illustrated, the textual segment 222 includes text from the text element 218d of the infographic segment 214b.

As mentioned, FIGS. 3-4 and the corresponding disclosure provide additional details regarding the machine-learning-detection model in accordance with one or more embodiments. In particular, FIG. 3 includes a flow chart illustrating the infographic parsing system 106 training a machine-learning-detection model in accordance with one or more embodiments.

As an overview of FIG. 3, the infographic parsing system 106 trains a machine-learning-detection model to generate predicted infographic segments using sample infographics in at least one embodiment. In particular, the infographic parsing system 106 inputs a sample infographic 302 into a machine-learning-detection model 304, which generates candidate segments and predicted segment-confidence values 306. The candidate segments represent sample candidate infographic segments from the sample infographic 302. While the terms are interchangeable, this disclosure refers to such sample candidate infographic segments as candidate segments for ease of reference. Based on the candidate segments and predicted segment-confidence values 306, the infographic parsing system 106 determines predicted infographic segments 308 comprising predicted annotations 309 and predicted location identifiers 311.

Further to the overview of FIG. 3, the infographic parsing system 106 can present the sample infographic 302 to a user using an annotation tool 310 for generating ground-truth data. More specifically, the infographic parsing system 106 receives ground-truth location identifiers 314 and ground-truth annotations 316 identified by a user via the annotation tool 310. The infographic parsing system 106 compares the ground-truth annotations 316 with the predicted annotations 309 (e.g., by applying a loss function 312). Moreover, in one or more embodiments, the infographic parsing system 106 compares the ground-truth location identifiers 314 with the predicted location identifiers 311 (e.g., by applying a loss function 318). The infographic parsing system 106 modifies machine-learning parameters of the machine-learning-detection model 304 based on the loss function 312 and the loss function 318.

As illustrated in FIG. 3, the infographic parsing system 106 trains the machine-learning-detection model 304 utilizing the sample infographic 302. In particular, the infographic parsing system 106 can select the sample infographic 302 from a database of infographics comprising thousands of potential infographics of a variety of sizes, topics, styles, and formats. For example, the potential infographics can cover a range of topics including healthcare, education, business, etc. In certain implementations, the infographic parsing system 106 can customize or personalize the machine-learning-detection model to a specific type of infographic, a specific user, group of users, or organization through its selection of the sample infographic 302. For example, the infographic parsing system 106 can select the sample infographic 302 based on determining that the sample infographic 302 has particular traits (e.g., size, topic, style, format). In at least one embodiment, the infographic parsing system 106 identifies the particular traits based on user input (e.g., via the annotation tool 310). Additionally, or alternatively, the infographic parsing system 106 determines the particular traits based on analyzing infographics that the infographic parsing system 106 has received for analysis from the user, group of users, or organization.

As further illustrated in FIG. 3, the infographic parsing system 106 partitions the sample infographic 302 into overlapping sample infographic frames 320a-320c. Generally, the infographic parsing system 106 can enable the parsing and analysis of large infographics by breaking the infographics into overlapping sample infographic frames. For example, in at least one embodiment, the infographic parsing system 106 arbitrarily determines the overlapping sample infographic frames 320a-320c. In some cases, the infographic parsing system 106 determines dimensions for a maximum size of infographic frame and partition the sample infographic 302 using the dimensions.

As further illustrated, the infographic parsing system 106 inputs the sample infographic 302 into the machine-learning-detection model 304. In particular, the infographic parsing system 106 feeds each of the overlapping sample infographic frames 320a-320c into the machine-learning-detection model 304. Generally, the machine-learning-detection model 304 analyzes each of the overlapping sample infographic frames 320a-320c to identify sets of sample text elements and/or sample graphic elements that correspond to lists or groups according to the infographic grouping taxonomy. More particularly, the machine-learning-detection model 304 generates the candidate segments and the predicted segment-confidence values 306. For example, the machine-learning-detection model 304 identifies candidate segments within the overlapping sample infographic frames 320a-320c and determines corresponding sample segment-confidence values.

As suggested above, in some embodiments, a predicted segment-confidence value indicates whether a particular candidate segment comprises a discrete component from a sample infographic, such as a sample list or a sample group of related text and/or graphic elements. For example, the predicted segment-confidence values can comprise probability values (e.g., from 0-1) that indicate a likelihood that a candidate segment comprises a list or group of related text and graphic elements from a sample infographic (or comprises some other discrete component from the sample infographic).

As further illustrated in FIG. 3, the infographic parsing system 106 determines the predicted infographic segments 308 based on the candidate segments and the predicted segment-confidence values 306. In some cases, the machine-learning-detection model 304 generates the predicted infographic segments 308 by utilizing non-maximal suppression to identify candidate segments with the highest segment-confidence values. As shown in FIG. 3, the predicted infographic segments 308 can comprise the predicted annotations 309 and the predicted location identifiers 311. In some cases, the predicted annotations 309 identify predicted lists or groups of sample text elements or sample graphic elements within the predicted infographic segments 308. Accordingly, the predicted annotations 309 may identify groups, lists, text, or graphics within the predicted infographic segments 308. By contrast, the predicted location identifiers 311 identify locations of the predicted infographic segments 308 within the sample infographic 302.

In at least one embodiment, the machine-learning-detection model 304 comprises a Single Shot MultiBox Detector ("SSD"). Additionally, the infographic parsing system 106 may utilize various techniques in training and applying the machine-learning-detection model 304. Techniques for training and applying a Single Shot MultiBox Detector are further described in Wei Liu et al., "SSD: Single Shot MultiBox Detector," European Conference on Computer Vision (Springer, Cham, 2016), the disclosure of which is incorporated by reference herein in its entirety. Alternatively, the machine-learning-detection model can comprise a convolutional neural network ("CNN") with a different arrangement or set of layers than an SSD, a region-based CNN (e.g., Fast R-CNN or Faster R-CNN), a Spatial Pyramid Pooling ("SPP") network, or a You Only Look Once ("YOLO") detector. As described below, FIG. 4 illustrates layers of an example SSD machine-learning-detection model in at least one embodiment.

As mentioned, in some embodiments, the predicted infographic segments 308 comprise candidate segments corresponding to the highest segment-confidence values. In particular, the predicted infographic segments 308 comprise data identifying discrete components from the sample infographic 302 comprising elements corresponding to a list or a group. For example, the predicted infographic segments 308 can include predicted location identifiers 311 comprising location data for identified text elements and/or graphic elements within an identified group or list. In at least one embodiment, the predicted location identifiers 311 comprise location data indicating boundaries that delineate the text and/or graphic elements corresponding to a list or group according to the infographic grouping taxonomy.

Figure 6:
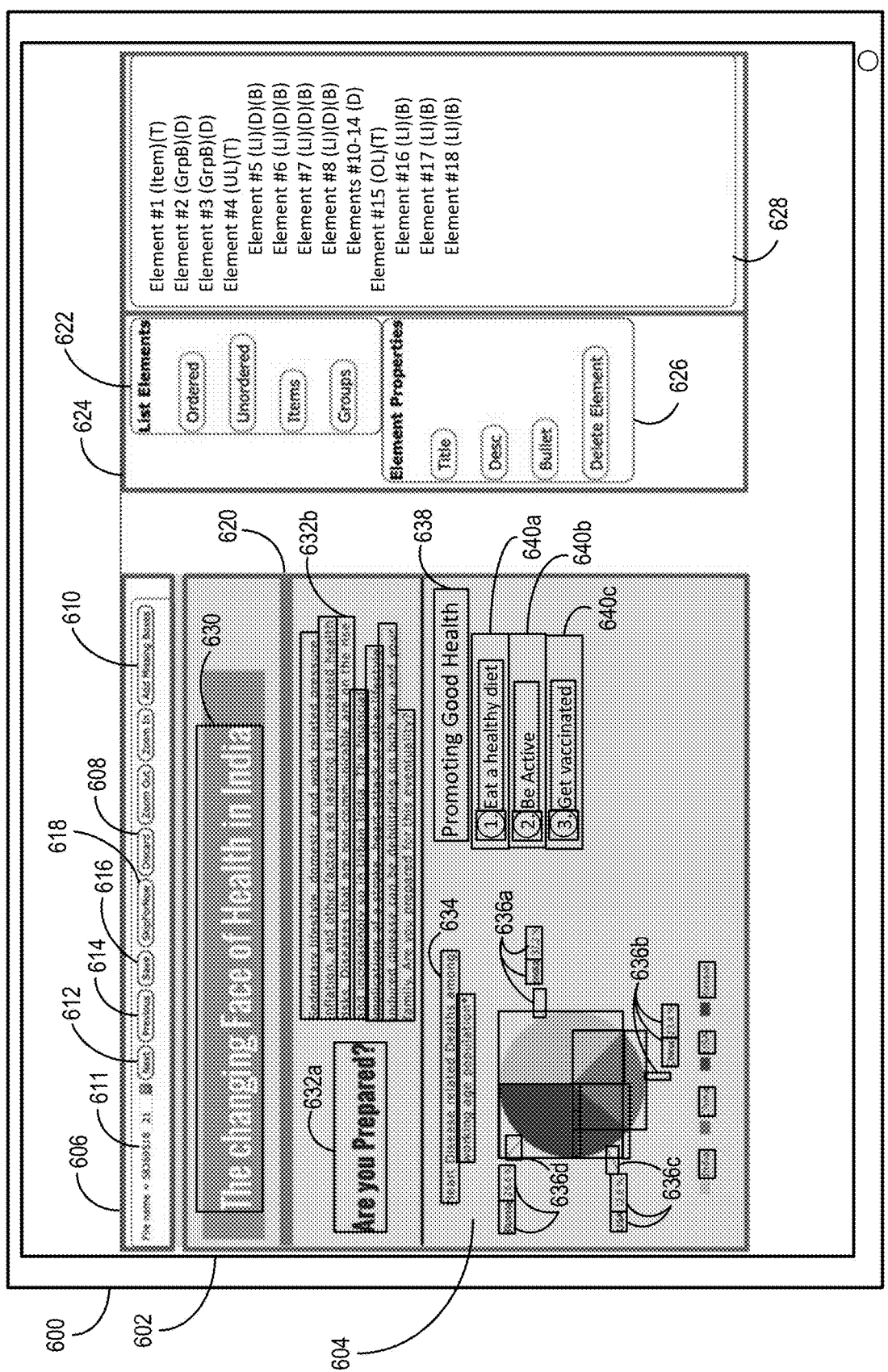
FIG. 6 illustrates an example of an annotation graphical user interface from the infographic parsing system to generate ground-truth annotations and ground-truth location identifiers in accordance with one or more embodiments of the present disclosure.

As further indicated above, the infographic parsing system 106 compares the predicted infographic segments 308 with ground-truth data. More specifically, the infographic parsing system 106 generates ground-truth data utilizing the annotation tool 310 for the sample infographic 302. Generally, the annotation tool 310 associates annotations with text and graphical elements within the sample infographic 302 to identify a ground-truth list data structure according to the infographic grouping taxonomy. The infographic parsing system 106 may provide, for display at a user client device, various text elements and graphic elements within the sample infographic 302 and provide options for labeling and/or grouping the text and graphic elements. The infographic parsing system 106 receives the user input to create the ground-truth location identifiers 314 and the ground-truth annotations 316. As described below, FIG. 6 illustrates an example annotation graphical user interface in accordance with one or more embodiments.

Turning back to FIG. 3, in certain embodiments, the ground-truth location identifiers 314 comprise location data for identified groups of related text and/or graphic elements. In particular, similar to the predicted infographic segments 308, the ground-truth location identifiers 314 comprise one or more text elements or graphic elements that the user has indicated are related and correspond to a particular list or group within the sample infographic 302. For example, in some cases, the ground-truth location identifiers 314 can include coordinates and dimensions of borders that include the related text elements and/or graphic elements.

As suggested above, in certain embodiments, the infographic parsing system 106 determines a first set of losses between the predicted location identifiers 311 and the ground-truth location identifiers. As illustrated in FIG. 3, the infographic parsing system 106 compares the predicted location identifiers 311 with the ground-truth location identifiers 314 using the loss function 318. In some embodiments of the loss function 318, the infographic parsing system 106 determines localization losses representing differences in location between the predicted location identifiers 311 for the predicted infographic segments 308 and the ground-truth location identifiers 314.

As further suggested above, the infographic parsing system 106 can determine a second set of losses between the predicted annotations 309 and the ground-truth annotations 316. More particularly, and as illustrated in FIG. 3, the infographic parsing system 106 compares the predicted annotations 309 with the ground-truth annotations 316 using the loss function 312. In at least one embodiment of the loss function 312, the infographic parsing system 106 determines classification losses based on a comparison of the predicted annotations 309 and the ground-truth annotations 316.

As further illustrated in FIG. 3, the infographic parsing system 106 can modify machine-learning parameters of the machine-learning-detection model 304 based on the loss function 312 and the loss function 318. In at least one embodiment, the infographic parsing system 106 determines weighted sums of the localization losses as determined by the loss function 318 and classification losses as determined by the loss function 312. For example, the infographic parsing system 106 can determine a model loss based on a weighted sum between the localization loss and the classification loss.

FIG. 3 illustrates a single iteration of the infographic parsing system 106 training the machine-learning-detection model 304. In a subsequent training iteration, the infographic parsing system 106 likewise generates additional predicted segment-confidence values and additional predicted infographic segments corresponding to additional ground-truth annotations and additional ground-truth location identifiers, respectively. The infographic parsing system 106 trains the machine-learning-detection model 304 to accurately generate segment confidence values and infographic segments by iteratively determining a first set of losses between the additional infographic segments and the additional ground-truth location identifiers and determining a second set of losses between the segment-confidence values and the ground-truth annotations. In some cases, the infographic parsing system 106 performs training iterations until the value or weights of the machine-learning-detection model 304 do not change significantly across training iterations or otherwise satisfy a convergence criteria.

As mentioned, in at least one embodiment, the machine-learning-detection model 304 comprises an SSD. FIG. 4 and the corresponding discussion provide additional detail for an example machine-learning-detection model in accordance with one or more embodiments. Although the machine-learning-detection model 400 illustrated in FIG. 4 comprises an SSD, in some embodiments, the machine-learning-detection model 400 can comprise any neural network comprising anterior layers and additional convolutional feature layers as described herein. As illustrated in FIG. 4, the infographic parsing system 106 inputs an overlapping infographic frame 402 into the machine-learning-detection model 400 to generate infographic segments.

As further illustrated in FIG. 4, the machine-learning-detection model 400 comprises anterior layers 404 and feature layers 406. The anterior layers 404 of the machine-learning-detection model 400 generate feature vectors or a feature map representing the overlapping infographic frame 402. By contrast, among other things, the feature layers 406 of the machine-learning-detection model 400 predict proposed boxes for the overlapping infographic frame 402. Generally, the proposed boxes comprise predicted infographic segments in proposed box locations. For example, the proposed boxes comprise preliminary predictions of locations, shapes, and sizes of infographic segments. The feature layers 406 further refine the scale, shape, size, and locations of the proposed boxes. In some cases, the feature layers 406 produce adjustments to the proposed boxes to better match the infographic segment shape and generate candidate infographic segments. In particular, the feature layers 406 progressively decrease in size and allow predictions of detections of infographic segments at different aspect ratios and scales. Thus, the feature layers 406 can resample pixels or features of each proposed box to adjust the shape, size, and locations of the proposed boxes. In at least one embodiment, each of the feature layers 406 produces a fixed set of predictions using a set of convolutional filters.

As indicated above, the machine-learning-detection model 400 can accurately and efficiently identify infographic segments from infographics. In particular, the machine-learning-detection model 400 can detect infographic segments of different aspect ratios. For instance, in some embodiments, the machine-learning-detection model 400 applies a predictor network for different aspect ratios to multiple feature maps from the several feature layers 406. Thus, the machine-learning-detection model 400 performs detection at multiple scales. Because of this multi-scale detection, the machine-learning-detection model 400 can improve accuracy using overlapping infographic frames, which further increases detection speed.

In at least one embodiment, the machine-learning-detection model 400 comprises a convolutional neural network that produces a fixed-size collection of candidate infographic segments and corresponding segment-confidence values followed by a non-maximal suppression step to produce final infographic segments. For example, and as illustrated in FIG. 4, the machine-learning-detection model 400 comprises a truncated base network (e.g., the anterior layers 404) together with convolutional feature layers (e.g., the feature layers 406).

Figure 5:
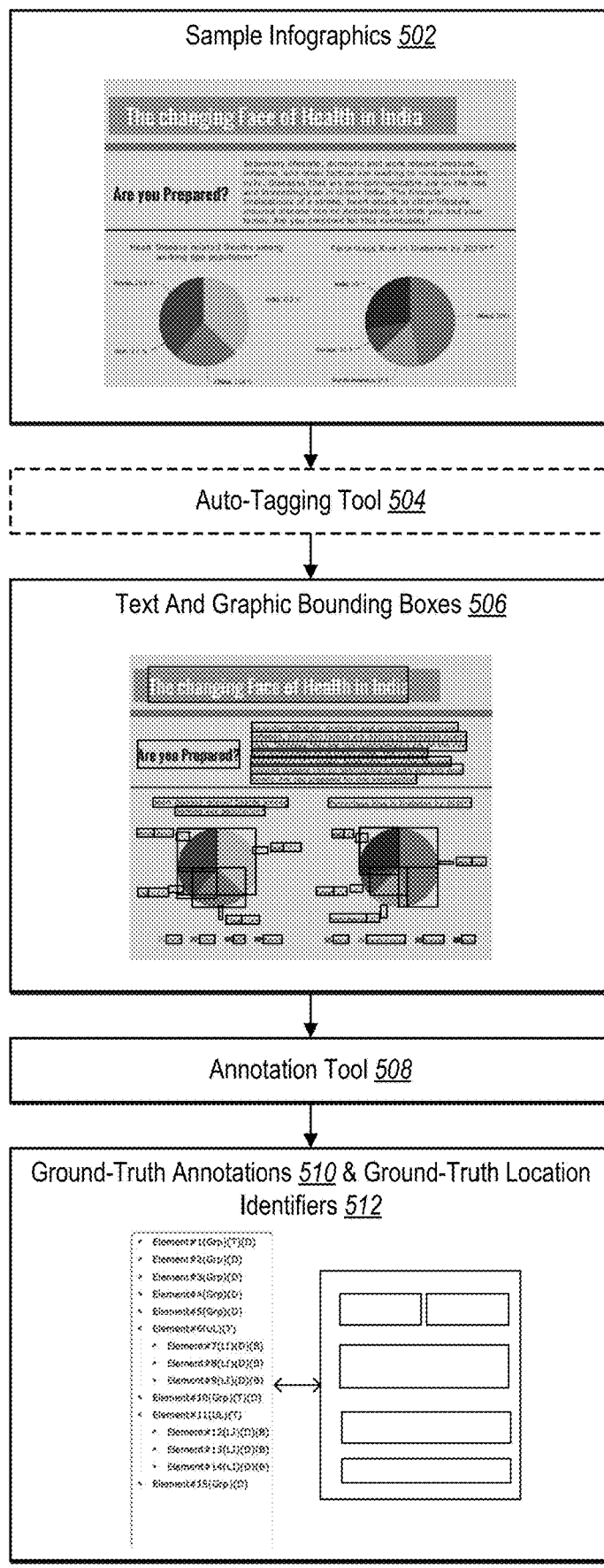
FIG. 5 illustrates a flow diagram providing an overview of the infographic parsing system generating ground-truth annotations and ground-truth location identifiers for training a machine-learning-detection model in accordance with one or more embodiments of the present disclosure.

As indicated above, the infographic parsing system 106 can generate ground-truth data for training the machine-learning-detection model. FIG. 5 provides an overview of the infographic parsing system 106 generating ground-truth annotations 510 and ground-truth location identifiers 512 based on auto detection and user input according to one or more embodiments. As an overview of FIG. 5, the infographic parsing system 106 can receive a sample infographic 502. The infographic parsing system 106 utilizes an auto-tagging tool 504 to generate text and graphic bounding boxes 506 within the sample infographic 502. The infographic parsing system 106 inputs the sample infographic 502 with the text and graphic bounding boxes 506 into an annotation tool 508 to generate the ground-truth annotations 510 and the ground-truth location identifiers 512 based on user input.

As illustrated in FIG. 5, the infographic parsing system 106 accesses the sample infographic 502. In particular, the infographic parsing system 106 may select and/or receive the sample infographic 502 from an infographic database. In at least one embodiment, the infographic parsing system 106 may utilize each infographic within an infographic database as the sample infographic 502. In other embodiments, the infographic parsing system 106 can customize the machine-learning-detection model by training the machine-learning-detection model using select sample infographics that meet certain criteria. More particularly, the infographic parsing system 106 may filter potential sample infographics based on user input of desired criteria (e.g., a particular topic, style, format, size).

As further illustrated in FIG. 5, in one or more embodiments, the infographic parsing system 106 inputs the sample infographic 502 into the auto-tagging tool 504. In particular, the auto-tagging tool 504 detects text elements and graphic elements and generates bounding boxes that indicate the text elements and the graphic elements. The infographic parsing system 106 can use the auto-tagging tool 504 to facilitate the annotation of elements into structured lists and groups according to the infographic grouping taxonomy. As further illustrated, the infographic parsing system 106 may also omit the auto-tagging tool 504 for some or all components of the sample infographics 502. For instance, instead of automatically generating text and graphic bounding boxes, the infographic parsing system 106 may rely on users to identify elements within the sample infographic 502 using the annotation tool 508.

Generally, as illustrated in FIG. 5, the auto-tagging tool 504 generates the text and graphic bounding boxes 506. More particularly, the auto-tagging tool 504 generates text bounding boxes that outline text elements and graphic bounding boxes that outline graphic elements. In some embodiments, the infographic parsing system 106 can visually differentiate text bounding boxes from graphic bounding boxes. For instance, the infographic parsing system 106 may use bounding boxes of one set of colors or patterns for text bounding boxes and another set of colors or patterns for graphic bounding boxes.

As further illustrated in FIG. 5, the infographic parsing system 106 inputs the sample infographic 502 into the annotation tool 508. In at least one embodiment, the infographic parsing system 106 also inputs the text and graphic bounding boxes 506 into the annotation tool 508. Generally, the infographic parsing system 106 utilizes the annotation tool 508 to annotate elements within the sample infographic 502 in structured lists and groups based on user selections. As illustrated in FIG. 6 below, the infographic parsing system 106 can provide an annotation graphical user interface for display at a client device. As described further below, the infographic parsing system 106 can receive annotations (e.g., annotation labels) via such an annotation graphical user interface.

Turning back to FIG. 5, the infographic parsing system 106 utilizes the annotation tool 508 to generate the ground-truth annotations 510 and the ground-truth location identifiers 512 for training the machine-learning detection model. For example, in at least one embodiment, the infographic parsing system 106 exports the annotations identified by a user as a nested list hierarchy. As illustrated, the ground-truth annotations 510 comprise a nested list hierarchy that reflects groups and lists of elements. Furthermore, the infographic parsing system 106 identifies the locations of groups and lists of elements to generate the ground-truth location identifiers 512.

As mentioned previously, the infographic parsing system 106 can provide, for display at a client device, an annotation graphical user interface for generating ground-truth annotations. For instance, the infographic parsing system 106 provides a sample infographic along with elements and features for associating annotations with elements of the sample infographic. FIG. 6 illustrates an annotation graphical user interface 604 for display at a screen 602 of a client device 600 in accordance with one or more embodiments.

For instance, FIG. 6 illustrates the annotation graphical user interface 604 including a sample-infographics-navigation menu 606, a sample infographic 620, labels 624, and list data structure 628. The infographic parsing system 106 can associate annotations with text and graphic elements of the sample infographic 620 based on user interaction with elements of the annotation graphical user interface 604.

As illustrated in FIG. 6, the annotation graphical user interface 604 includes the sample-infographics-navigation menu 606. Generally, the sample-infographics-navigation menu 606 facilitates navigating between individual sample infographics within an infographic database. The sample-infographics-navigation menu 606 includes various elements for navigating between sample infographics within the infographic database. For instance, the sample-infographics-navigation menu 606 includes a file name 611, a next element 612, a previous element 614, a save element 616, and a skip element 618. The file name 611 indicates a file name associated with the sample infographic 620 displayed by the annotation graphical user interface 604. Based on detecting user interaction with the next element 612 or the previous element 614, the client device 600 can update the annotation graphical user interface 604 to display the next or previous sample infographic from the infographic database, respectively. Based on user interaction with the skip element 618, the client device 600 may update the annotation graphical user interface 604 to display the next sample infographic but present the sample infographic 620 again in the future.

Additionally, the sample-infographics-navigation menu 606 includes elements for selecting sample infographics for training the machine-learning-detection model. In particular, the infographic parsing system 106 can utilize user interaction with the sample-infographics-navigation menu 606 to discard sample infographics from a training dataset if the sample infographics do not meet desired criteria (e.g., a particular topic, style, format, size). For example, as illustrated in FIG. 6, the sample-infographics-navigation menu 606 includes a discard element 608. The discard element 608 enables a user to identify sample infographics that are not relevant to infographics that the machine-learning-detection model must analyze during application. In particular, based on receiving a notification of user interaction with the discard element 608, the infographic parsing system 106 can remove the sample infographic 620 from the training dataset.

As further shown in FIG. 6, the sample-infographics-navigation menu 606 also includes additional elements for managing the sample infographic 620. For instance, the sample-infographics-navigation menu 606 includes an add-new-element option 610. In at least one embodiment, the infographic parsing system 106 automatically identifies and provides text and graphic elements for annotation. Based on user interaction with the add-new-element option 610, the infographic parsing system 106 can add new bounding boxes for text and/or graphic elements indicated by the user.

As further depicted in FIG. 6, the sample-infographics-navigation menu 606 can also include elements for changing the view of the sample infographic 620. For instance, the sample-infographics-navigation menu 606 includes options for zooming in and out of the sample infographic 620. Thus, the client device 600 can increase or decrease the size of elements within the sample infographic 620 to facilitate selection of the elements. Though not illustrated, the sample-infographics-navigation menu 606 may include additional options for scrolling (up and down or side to side) within the sample infographic 620.

As further illustrated in FIG. 6, the client device 600 also displays the sample infographic 620 within the annotation graphical user interface 604. In particular, the sample infographic 620 comprises text elements and graphic elements. For instance, the sample infographic 620 includes a title text element 630, description text elements 632a-632b, a header text element 634, and element sets 636a-636d. Furthermore, the sample infographic 620 includes a header text element 638 and the element sets 640a-640c. As illustrated, the client device 600 presents text bounding boxes around text elements and graphic bounding boxes around graphic elements. The infographic parsing system 106 can automatically generate the text bounding boxes and graphic bounding boxes or receive indications of the bounding boxes as input from the client device 600. In any case, the bounding boxes may comprise selectable elements. As such, the client device 600 detects selection of one of the selectable elements and an annotation label from the annotation labels menu 622.

In at least one embodiment, the client device 600 may indicate group and list information by utilizing the bounding boxes within the sample infographic 620. In particular, the bounding boxes may be color coded by group or list. For instance, the element sets 636a-636d can be within bounding boxes of the same color indicating that the element sets 636a-636d are within the same group. Additionally, based on detecting selection of a bounding box of one element, the client device 600 can highlight related elements. For instance, based on detecting user selection of the description text element 632a, the client device 600 can highlight the bounding box around the related description text element 632b.

As further illustrated in FIG. 6, the annotation graphical user interface 604 includes the labels 624. The labels 624 comprise selectable annotations that the infographic parsing system 106 can associate with elements within the sample infographic 620. As illustrated, the labels 624 include annotation labels menu 622 and element property labels menu 626. The annotation labels menu 622 includes annotation labels that indicate the status of a particular element within a list or group structure according to the infographic grouping taxonomy. For example, the annotation labels menu 622 includes the following annotation labels: ordered, unordered, items, and groups. The ordered annotation label indicates that the selected one or more elements are part of an ordered list. The unordered annotation label indicates that the selected one or more elements are part of an unordered list. The item annotation label indicates that a particular element is a stand-alone item. The groups annotation indicates that selected elements are part of a group.

As indicated above, the infographic parsing system 106 may designate multiple text and graphic elements as part of a group using the group annotation label. As previously mentioned, a group can comprise a collection of related graphic elements and/or text elements. The infographic parsing system 106 can combine elements within a group based on detecting selection of (i) text and/or graphic elements within the sample infographic 620 and (ii) a group annotation label. The infographic parsing system 106 can list combinations of graphic and text elements within a group. Additionally, or alternatively, the infographic parsing system 106 can list elements of the same type (e.g., text with text and graphic with graphic) within a group. For instance, the infographic parsing system 106 may erroneously auto-tag two separate text bounding boxes from a single block of text. Based on detecting selection of both text bounding boxes and the group annotation label, the infographic parsing system 106 can combine both text elements as parts of a group. Furthermore, the infographic parsing system 106 can simply organize related elements within a group. For example, the infographic parsing system 106 can designate the description text element 632a and the description text element 632b as part of a group.

Additionally, the infographic parsing system 106 may group one or more graphic elements and text elements. For example, the infographic parsing system 106 may designate all elements within the element set 636a as part of a group. Similarly, the infographic parsing system 106 may designate each of the element sets 636b, 636c, and 636d as groups. In other words, the element set 636b comprises a group, the element set 636c comprises a group, and the element set 636d comprises a group. Similarly, the infographic parsing system 106 may designate each of the element sets 640a, 640b, and 640c as a group. As indicated in FIG. 6, the infographic parsing system 106 may identify groups as list elements in lists. For example, the infographic parsing system 106 can create a nested list structure in which each element set within the element sets 636a-636d and 640a-640c comprise a list element.

As further illustrated in FIG. 6, the infographic parsing system 106 may designate single text and graphic elements as items. In particular, based on receiving a notification of user interaction with the item annotation label, the infographic parsing system 106 designates a selected element as an individual item. For instance, as illustrated, the infographic parsing system 106 designates the title text element 630 as an item. As indicated in FIG. 6, items may comprise list elements in lists.

In some embodiments, the infographic parsing system 106 can further organize identified groups and items into lists. In particular, the infographic parsing system 106 can create both ordered and unordered lists. As mentioned, the order in which list elements are presented can be important (e.g., numbered lists), whereas list elements within an unordered list may be presented in any order. For example, as illustrated in FIG. 6, the infographic parsing system 106 designates each of the element sets 640a-640c as list elements within an ordered list. Additionally, as illustrated in FIG. 6, the infographic parsing system 106 can designate each of the element sets 636a-636d as list elements within an unordered list.

In at least one embodiment, the infographic parsing system 106 associates additional labels with elements of the sample infographic 620. Although not required to train the machine-learning-detection model using generate ground-truth location identifiers and ground-truth annotations, the infographic parsing system 106 may utilize the additional labels in other applications that will be discussed in additional detail below. In at least one embodiment, the annotation graphical user interface 604 provides the element property labels menu 626 as part of the labels 624. As illustrated in FIG. 6, the element property labels menu 626 include labels that indicate various element properties. For instance, element properties can include title, description, bullet, and delete element. The infographic parsing system 106 can recognize an element (e.g., the title text element 630) within the sample infographic 620 as a title and other elements (e.g., the description text elements 632a-632b) as descriptions. Additionally, the infographic parsing system 106 may designate elements within the sample infographic 620 as bullet points within a list. For instance, the infographic parsing system identifies the element sets 636a-636d and the element sets 640a-640c as bullet points within their respective lists.

Furthermore, in some embodiments, the infographic parsing system 106 can associate annotations with the sample infographic 620 to better fit criteria for training the machine-learning-detection model. In particular, the infographic parsing system 106 can remove annotations from the sample infographic 620 so that the sample infographic 620 better fits certain criteria. For instance, the elemental property labels menu 626 includes a delete element label. The infographic parsing system 106 can delete an element from the list data structure 628 based on user input associating the delete element label with the element. For example, based on user selection of the delete element label and the element set 640a, the infographic parsing system 106 can remove the corresponding element from the list data structure 628.

As further illustrated in FIG. 6, the client device 600 also displays the list data structure 628 within the annotation graphical user interface 604. In particular, the list data structure 628 provides an overview of the list structure based on associations between the annotation labels and elements within the sample infographic 620. Within the list data structure 628, for instance, the client device 600 displays how list elements (e.g., Element #1, Element #2) are organized with respect to each other according to the infographic grouping taxonomy. Furthermore, the list data structure 628 can include or identify annotation labels and element property labels associated with the various list elements.

As further illustrated in the list data structure 628 of FIG. 6, Element #1 within the list data structure 628 corresponds to the title text element 630. The list data structure 628 indicates that the title text element 630 is associated with an item annotation label (e.g., "item") and comprises a title element property label (e.g., "T"). Element #2 within the list data structure 628 corresponds to the description text element 632a, while Element #3 corresponds to the description text element 632b. As illustrated, the list data structure 628 indicates that Element #2 and Element #3 are parts of the same group (e.g., "GrpB") and are both associated with the annotation label of description (e.g., "D").

As further shown in the list data structure 628, Element #4-Element #8 correspond to the header text element 634 and the element sets 636a-636d. The list data structure 628 indicates that the Element #4, associated with the header text element 634, is also associated with the unordered list annotation label (e.g., "UL") and the title element property label. The list data structure 628 further indicates that the Element #5-Element #8, associated with the element sets 636a-636d are list items (e.g., "LI"), comprise descriptions, and bullets (e.g., "B"). Furthermore, the list data structure 628 indicates that Element #15, associated with the header text element 638, is a title of an ordered list (e.g., "OL") comprising Element #16-Element #18 corresponding to the element sets 640a-640c.

The preceding discussion provides details regarding how the infographic parsing system 106 utilizes one system for organizing elements according to an infographic grouping taxonomy. In other embodiments, the infographic parsing system 106 utilizes different annotation labels for annotating the sample infographic 620. For instance, the infographic parsing system 106 can recognize more or fewer annotation labels. Additionally, as illustrated, the infographic parsing system 106 recognizes two basic levels of lists—(i) items and groups organized within (ii) lists. In one or more embodiments, the infographic parsing system 106 organizes elements into additional levels of lists. For instance, the infographic parsing system 106 can label sub-lists within overarching lists.

Figure 7:
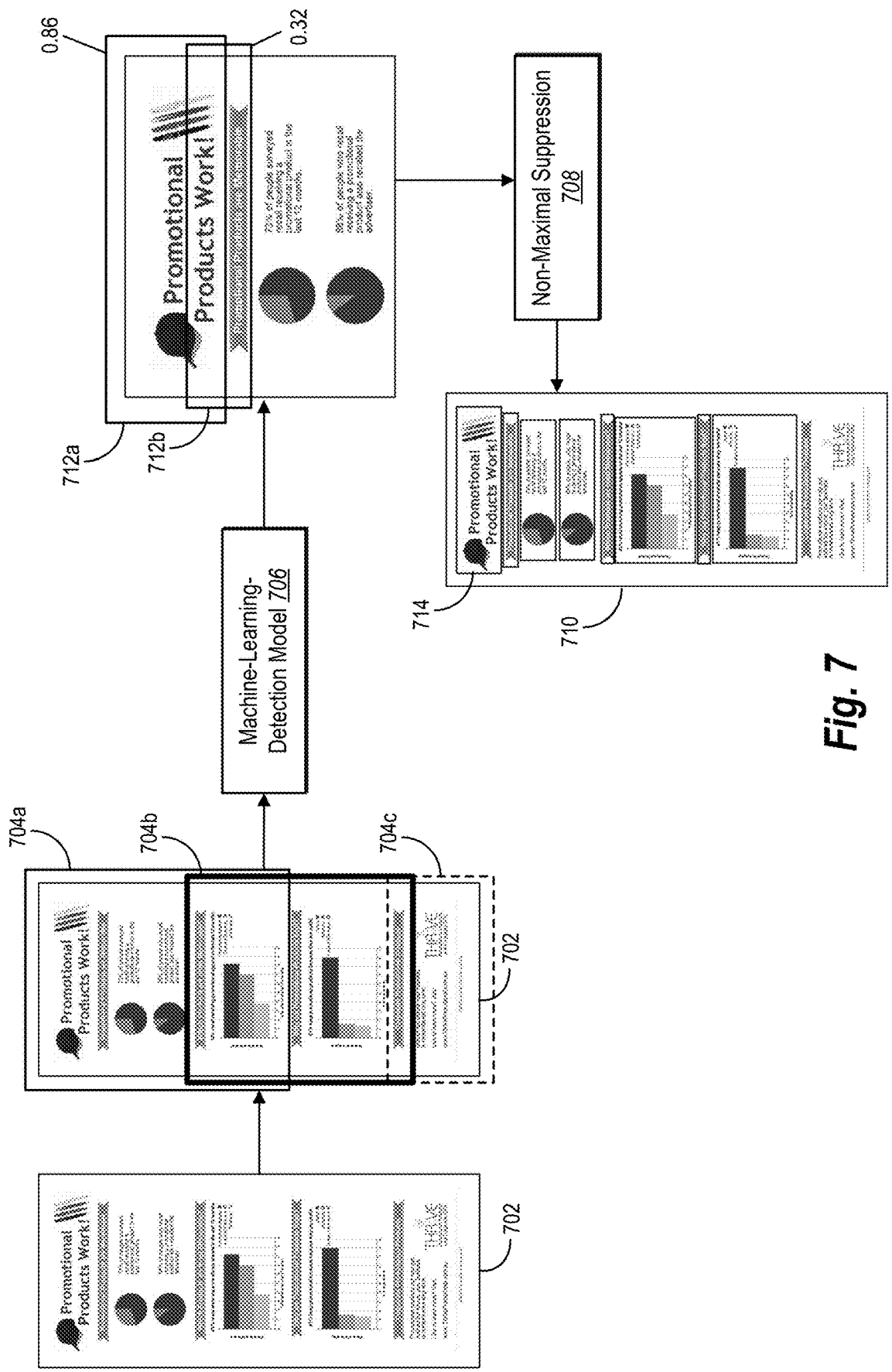
FIG. 7 illustrates a flowchart of the infographic parsing system applying a machine-learning-detection model to generate infographic segments in accordance with one or more embodiments of the present disclosure.

FIGS. 3-6 generally depict the infographic parsing system 106 training the machine-learning-detection model in at least one embodiment. By contrast, FIG. 7 and the corresponding disclosure provide additional detail regarding how the infographic parsing system 106 applies the machine-learning detection model in accordance with one or more embodiments. As illustrated in FIG. 7, the infographic parsing system 106 partitions an infographic 702 into overlapping infographic frames 704a-704c. The infographic parsing system 106 subsequently feeds the overlapping infographic frames 704a-704c into the machine-learning-detection model 706, which generates infographic segments 710.

Generally, the infographic parsing system 106 applies the machine-learning-detection model 706 to an input infographic. As illustrated in FIG. 7, the infographic 702 comprises text elements and graphic elements. The infographic 702 can comprise an infographic received from a client device (e.g., the user client device 108 or the administrator client device 116). Additionally, or alternatively, the infographic 702 can comprise an infographic identified from a third-party server as part of a query or other search.

As indicated above, in some embodiments, the infographic parsing system 106 facilitates parsing of large infographics by partitioning the infographic 702 into smaller overlapping windows or frames. In some cases, the infographic parsing system 106 arbitrarily partitions the infographic 702 into the overlapping infographic frames 704a-704c. For ease of view, FIG. 7 uses different line types to show outlines for the overlapping infographic frames 704a-704c. In at least one embodiment, the infographic parsing system 106 arbitrarily partitions the infographic 702 into the infographic frames 704a-704c.

As further illustrated in FIG. 7, the infographic parsing system 106 inputs each of the overlapping infographic frames 704a-704c into the machine-learning-detection model 706. Generally, the machine-learning-detection model 706 analyzes each of the overlapping infographic frames 704a-704c and generates candidate infographic segments. As indicated above, the candidate infographic segments can comprise a random assortment of components, components from different lists or groups, or discrete components from the infographic corresponding to a particular list or a particular group.

For instance, as illustrated in FIG. 7, the machine-learning-detection model 706 generates candidate infographic segments 712a and 712b corresponding to the infographic frame 704a. Furthermore, the machine-learning-detection model 706 generates segment-confidence values corresponding to each of the candidate infographic segments 712a and 712b indicating the probability that a particular candidate infographic segment comprises a list or a group of related elements. For instance, the infographic parsing system 106 determines that a segment-confidence value for the candidate infographic segment 712a equals 0.86 and a segment-confidence value for the candidate infographic segment 712b equals 0.32. Though FIG. 7 illustrates generating candidate infographic segments for the infographic frame 704a, the machine-learning-detection model 706 generates candidate infographic segments and corresponding segment-confidence values for each of the overlapping infographic frames 704a-704c.

As further illustrated in FIG. 7, in certain embodiments, the infographic parsing system 106 performs non-maximal suppression 708 on the candidate infographic segments (e.g., the candidate infographic segments 712a and 712b). In particular, the infographic parsing system 106 applies the non-maximal suppression 708 to combine identified candidate infographic segments over the overlapping infographic frames 704a-704c. For instance, the infographic parsing system 106 can sort overlapping candidate infographic segments, including candidate infographic segments located within the overlapping portions of the overlapping infographic frames 704a-704c, by their corresponding segment-confidence values. In some embodiments, the infographic parsing system 106 identifies overlapping candidate infographic segments, compares the corresponding segment-confidence values, and designates the candidate infographic segment with the higher segment-confidence value as the infographic segment.

In at least one embodiment, the infographic parsing system 106 utilizes an Intersection over Union (IoU) evaluation to identify overlapping candidate infographic segments from the overlapping infographic frames 704a-704c. In particular, the infographic parsing system 106 determines the IoU comprising a ratio of an area of overlap to an area of union between candidate infographic segments that intersect borders. For example, the infographic parsing system 106 determines an area of overlap and an area of union between the candidate infographic segments 712a and 712b. Based on determining that the IoU meets a threshold IoU value (e.g., 0.3), the infographic parsing system 106 determines that the candidate infographic segments 712a and 712b comprise overlapping candidate infographic segments. Based on determining that the candidate infographic segments 712a and 712b overlap, the infographic parsing system 106 compares the segment confidence values (e.g., 0.86 and 0.32) of the candidate infographic segments 712a and 712b. Because the infographic parsing system 106 determines that the candidate infographic segment 712a corresponds to the higher segment-confidence value, the infographic parsing system 106 selects the candidate infographic segment 712a as an infographic segment 714.

In one or more embodiments, the infographic parsing system 106 further processes the candidate infographic segments 712a and 712b to ensure that identified infographic segments are amenable to downstream operations, such as generating digital presentation graphics. If an infographic segment is too large, the infographic parsing system 106 may determine that a resulting digital presentation graphic would be prohibitively large or the infographic segment would be too small. Thus, the infographic parsing system 106 can determine to designate smaller candidate infographic segments as infographic segments. For instance, in at least one embodiment, the infographic parsing system 106 determines the fraction of the area of a candidate infographic segment to the area of the infographic. Based on determining that the fraction exceeds a threshold value (e.g., 0.5), the infographic parsing system 106 identifies a smaller overlapping candidate infographic segment with a high segment-confidence value.

As further illustrated in FIG. 7, the infographic parsing system 106 generates the infographic segments 710. In the embodiment illustrated in FIG. 7, the infographic segments 710 comprise the candidate infographic segments retained after the non-maximal suppression 708. In particular, the infographic segments 710 comprise a set of candidate infographic segments corresponding to a set of highest segment-confidence values. For example, the infographic segments 710 include the infographic segment 714.

As mentioned, by parsing infographics into infographic segments comprising related elements, in some cases, the infographic parsing system 106 facilitates reflow and reorganization of infographics. One application of parsing infographics is a query-response model, while another application of parsing infographics is reflowing infographic segments into slides or other digital presentation graphics. FIGS. 8A-8E illustrate a series of example graphical user interfaces presented by the infographic parsing system 106 utilizing a query-response model in at least one embodiment.

Figure 8A:
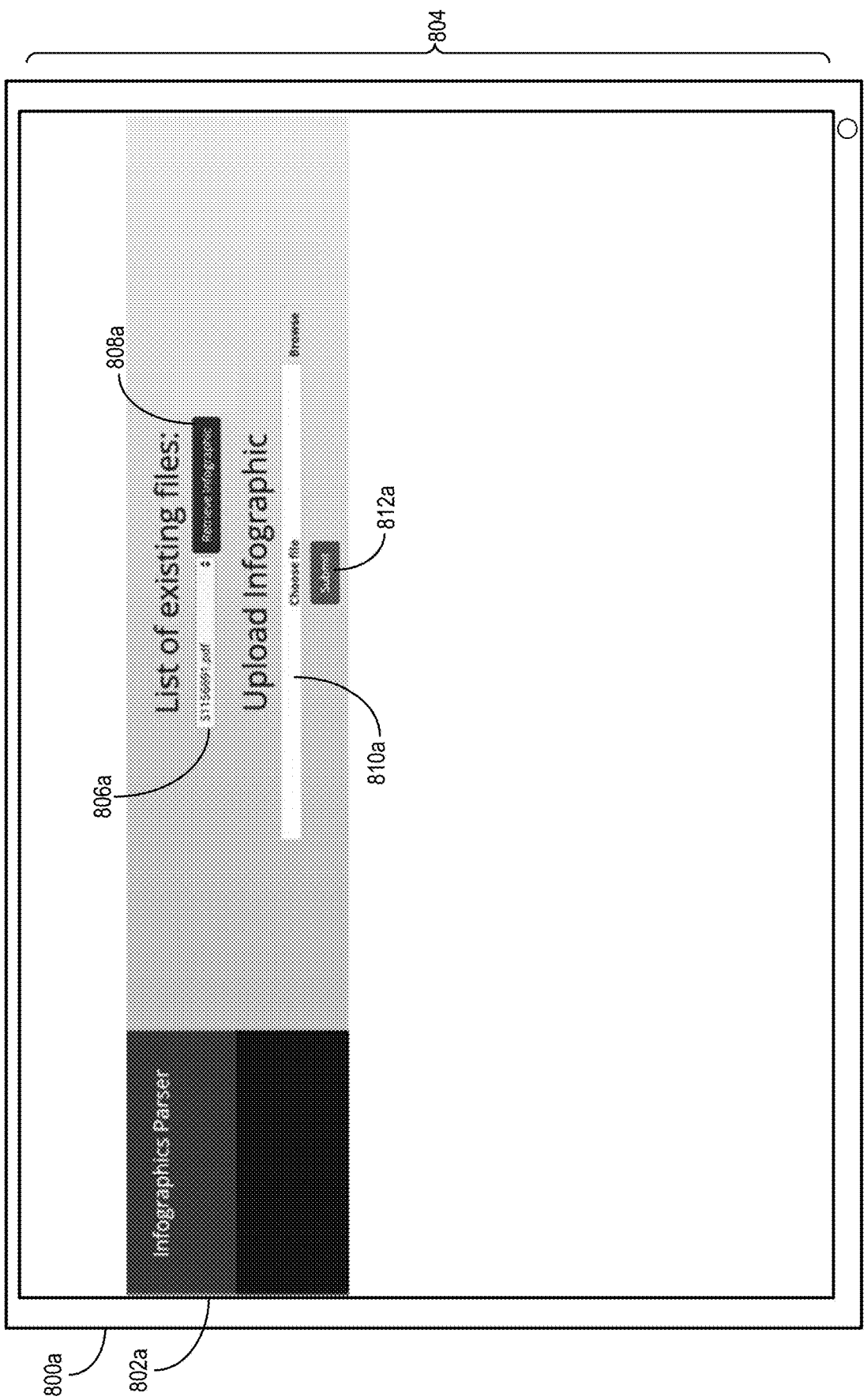
FIGS. 8A-8E illustrate a series of example graphical user interfaces for a query-response model in accordance with one or more embodiments of the present disclosure.

FIG. 8A illustrates an infographic-selection interface 804 displayed on screen 802a of client device 800a. The infographic-selection interface 804 includes elements and features for uploading an infographic for analysis by the infographic parsing system 106. In particular, the infographic-selection interface 804 includes a system-infographic identifier 806a, a system-infographic-selection element 808a, an external-infographic identifier 810a, and an infographic-selection element 812a.

As illustrated in FIG. 8A, the infographic parsing system 106 may upload infographics stored by the infographic parsing system 106. In particular, based on user selection of the system-infographic identifier 806a, the client device 800a presents identifiers for infographics stored within the infographic parsing system 106. Based on user selection of the system-infographic-selection element 808a, the client device 800a uploads the identified system infographic for analysis by the infographic parsing system 106. In at least one embodiment, the infographic parsing system 106 has already analyzed and parsed infographics stored by the infographic parsing system 106.

As further illustrated in FIG. 8A, the infographic parsing system 106 may upload infographics that are not stored by the infographic parsing system 106. In particular, the infographic parsing system 106 can access and/or receive infographics stored at an external source. Based on detecting user selection of the external-infographic identifier 810a, the client device 800a presents options for uploading an infographic from a different source, such as the client device 800a, a third-party content storage source, etc. For instance, the client device 800a can update the infographic-selection interface 804 to include files stored on the client device 800a to enable a user to select a desired infographic. Based on detecting selection of the infographic-selection element 812a, the client device 800a uploads the identified infographic to the infographic parsing system 106 for analysis.

Figure 8B:
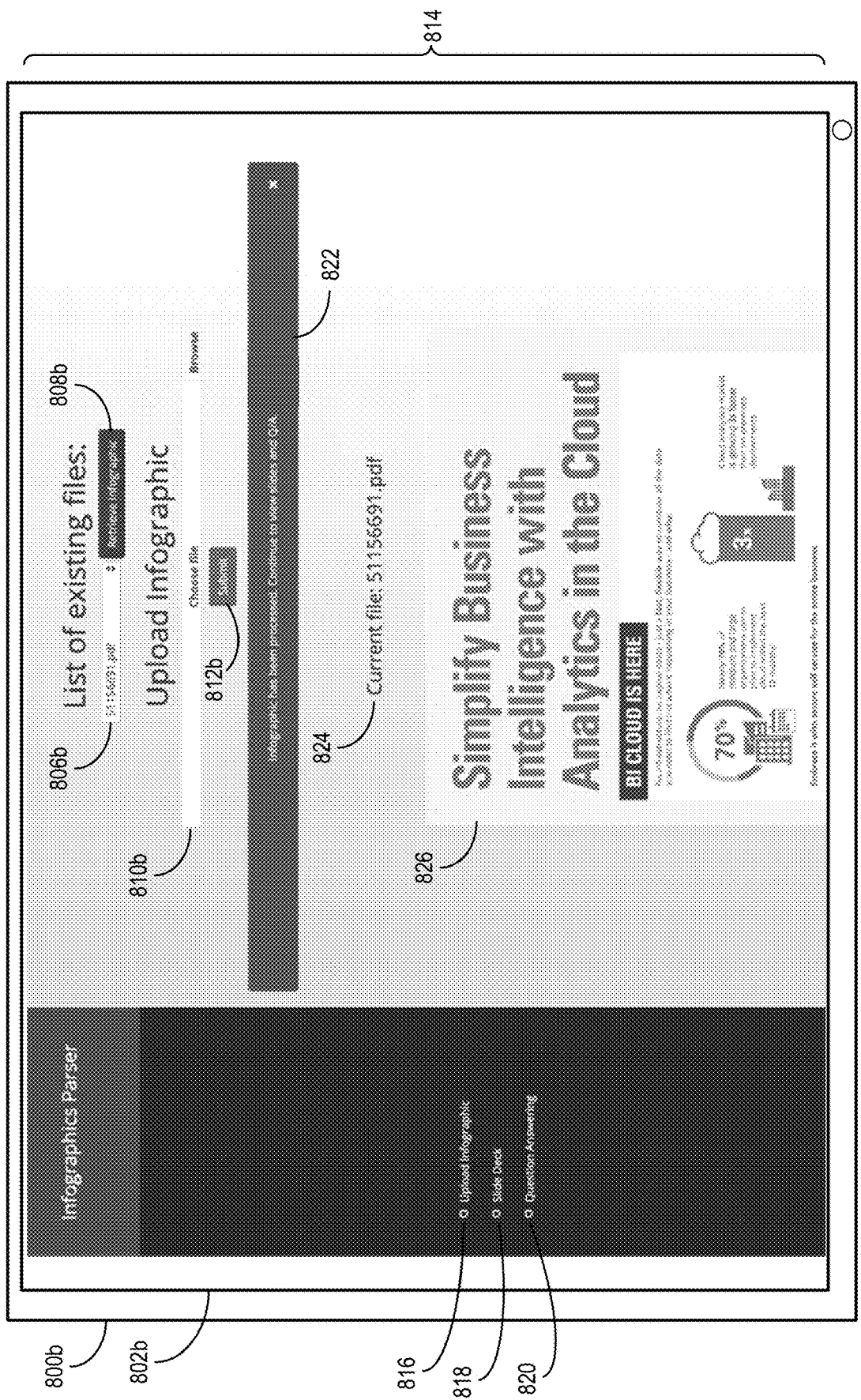

The infographic parsing system 106 can present a graphical user interface to preview an infographic after uploading the infographic. For instance, after receiving the selection of the infographic-selection element 812a, the client device can update the user interface to present an infographic-preview interface comprising additional elements and features for viewing the infographic. FIG. 8B illustrates an example infographic-preview interface 814 on screen 802b of a client device 800b. The infographic-preview interface 814 includes an infographic preview 826 to show the user which infographic will be—or has already been, in the case of system infographics—analyzed by the infographic parsing system 106. As illustrated in FIG. 8B, the infographic-preview interface 814 also includes a system-infographic identifier 806b, a system-infographic-selection element 808b, an external-infographic identifier 810b, and an infographic-selection element 812b.

As the transition from FIG. 8A to FIG. 8B suggests, the system-infographic identifier 806b, the system-infographic-selection element 808b, the external-infographic identifier 810b, and the infographic-selection element 812b respectively represent the system-infographic identifier 806a, the system-infographic-selection element 808a, the external-infographic identifier 810a, and the infographic-selection element 812a viewed in an updated graphical user interface.

The client device 800b presents information relevant to the uploaded infographic within the infographic-preview interface 814. In particular, the infographic-preview interface 814 includes a query-response model link 822, an infographic identifier 824, and the infographic preview 826. Based on user selection of the query-response model link 822, the client device 800b presents a query field for questions that may or may not relate to uploaded infographics. As shown in FIG. 8B, the infographic identifier 824 presents identifying information for the infographic shown by the infographic preview 826.

As further illustrated, the infographic-preview interface 814 includes elements for navigating to different graphical user interfaces. For example, the infographic-preview interface 814 includes an upload infographic link 816, a digital presentation graphic link 818, and a query-response model link 820. Based on user selection of any one of these links, the client device 800b displays the corresponding graphical user interface.

Based on detecting selection of the upload infographic link 816, for instance, the infographic parsing system 106 uploads the infographic-selection interface 804. Based on user selection of the digital presentation graphic link 818, the client device 800b presents a series of digital presentation graphics. More specifically, the client device 800b presents digital presentation graphics displaying infographic segments from the infographic associated with the infographic preview 826. Based on detecting user selection of the query-response model link 820, the client device 800b presents a query-response interface.

Figure 8C:
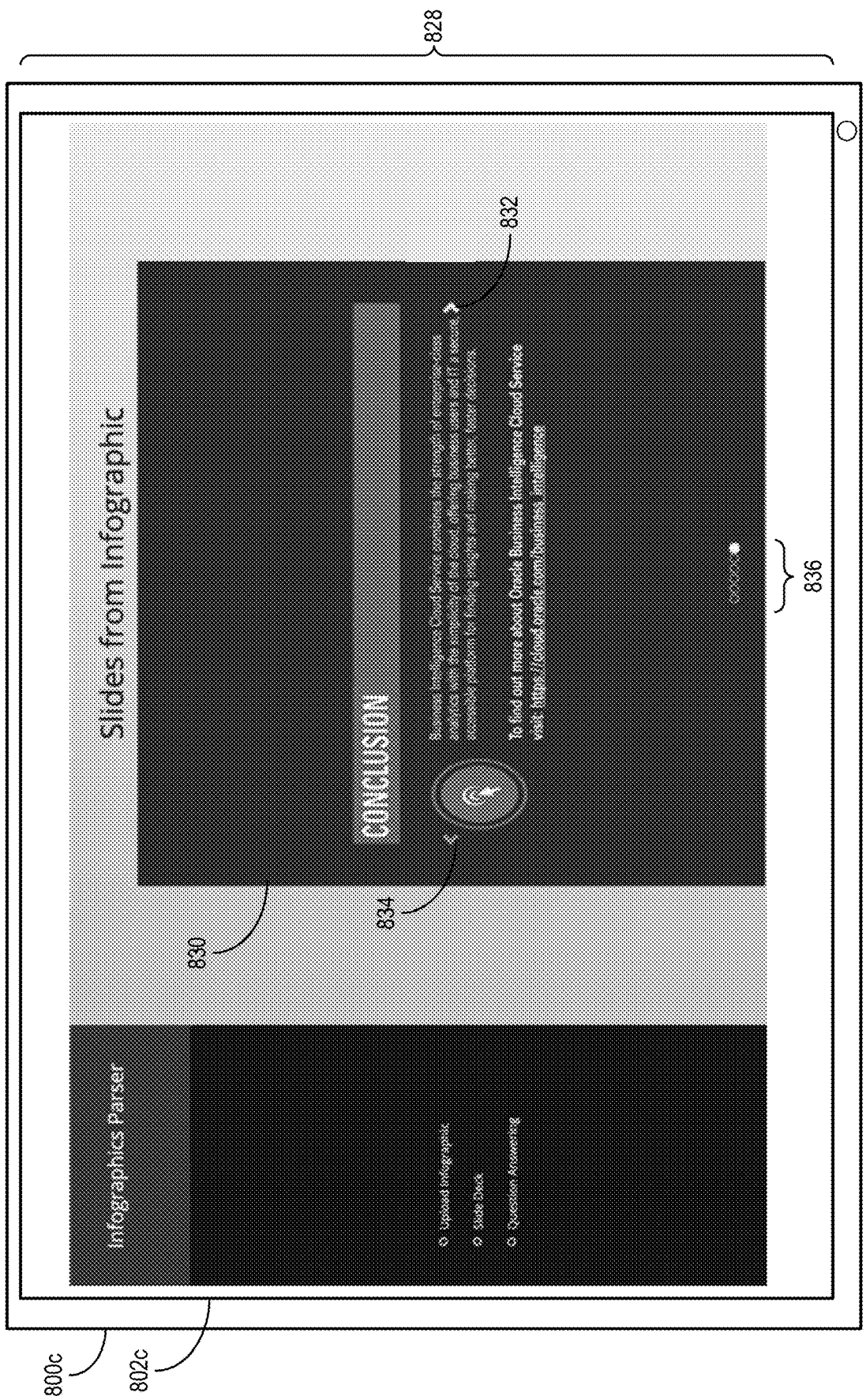

As mentioned, based on detecting user selection of a digital presentation graphic link (e.g., the digital presentation graphic link 818), the client device 800b can present a digital presentation graphical user interface. FIG. 8C illustrates an example presentation-graphics interface 828 displayed on a screen 802c of a client device 800c. The client device 800c displays infographic segments of an infographic on individual digital presentation graphics within the presentation-graphics interface 828. As indicated above, the infographic parsing system 106 partitions an infographic into its component infographic segments that can be reformatted and arranged in slides or other digital presentation graphics. Thus, the infographic parsing system 106 creates a new way of navigating data presented within an infographic.

As further illustrated in FIG. 8C, the presentation-graphics interface 828 includes a digital presentation graphic 830 as well as infographic navigation elements including a next graphic link 832, a previous graphic link 834, and a graphic navigation element 836. Based on detecting user interaction with the infographic navigation elements, the client device 800c displays different digital presentation graphics. For instance, based on user selection of the next graphic link 832, the client device 800c presents the next digital presentation graphic in a series of digital presentation graphics. Based on user selection of the previous graphic link 834, the client device 800c presents the previous digital presentation graphic in the series. The presentation-graphics interface 828 also provides elements for navigating directly to a particular digital presentation graphic. For instance, based on user selection of an object within the graphic navigation element 836, the client device 800c may update the digital presentation graphical user interface to display the corresponding digital presentation graphic.

Figure 8D:
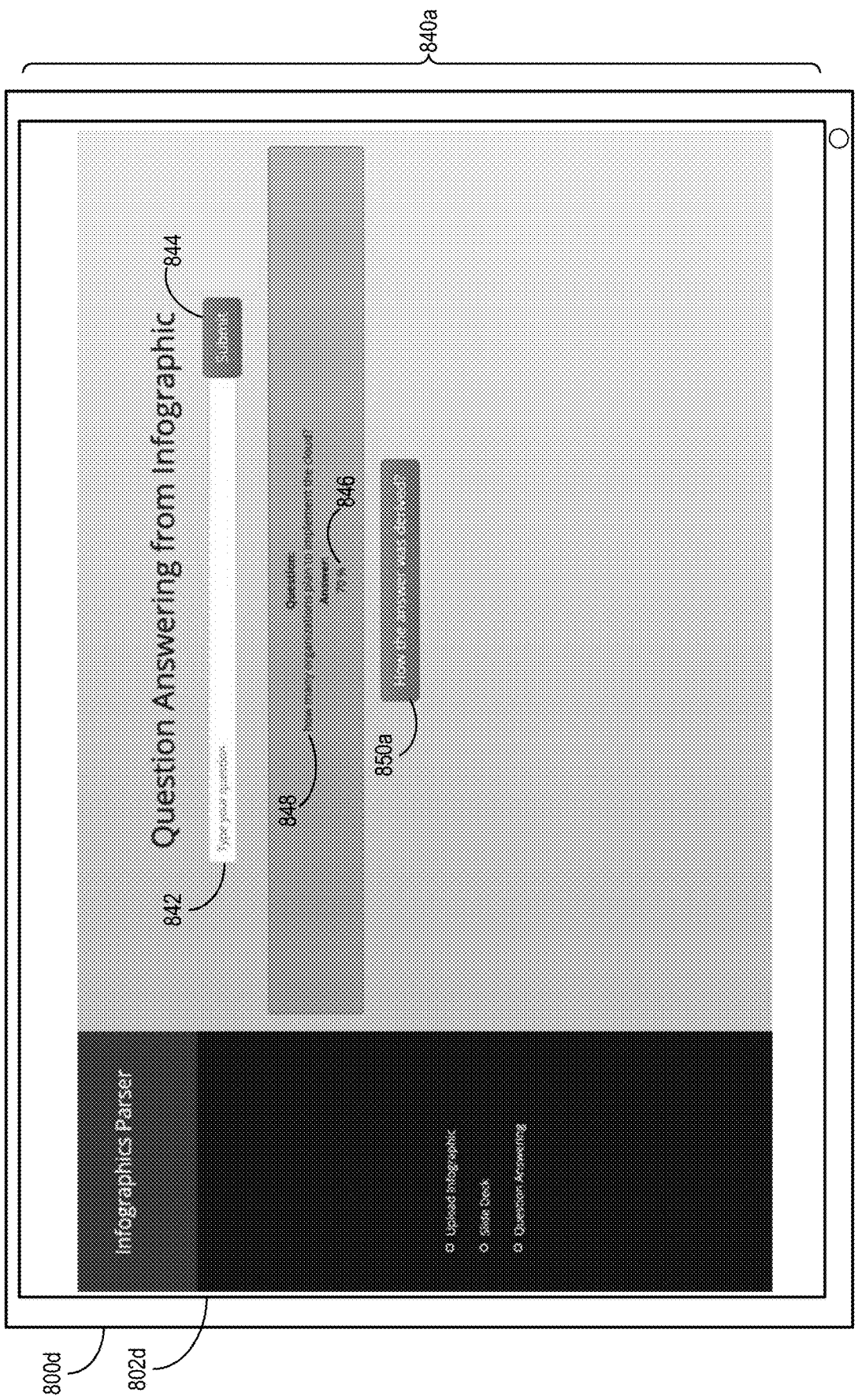
Figure 8E:
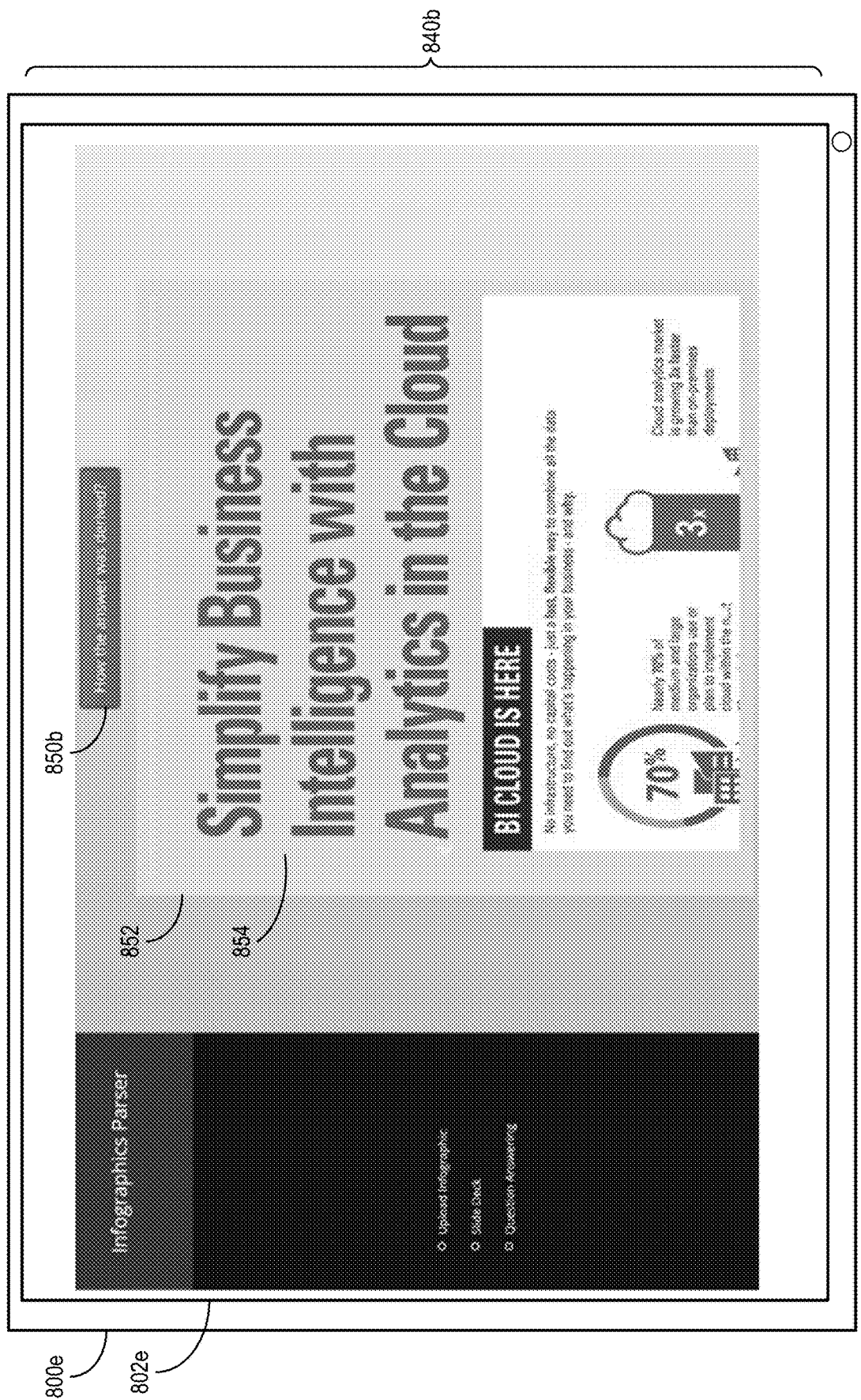

As mentioned, based on user selection of a query-response model link, the client device presents a graphical user interface for query and response. FIGS. 8D-8E depict a series of example query-response interfaces in accordance with at least one embodiment. FIG. 8D illustrates a query-response interface 840a displayed on a screen 802d of the client device 800d. The query-response interface 840a includes elements and areas for receiving queries regarding an infographic and presenting responses based on the infographic.

In at least one embodiment, to facilitate use of the query-response model with respect to an infographic, the infographic parsing system 106 performs an OCR algorithm on the infographic segments. In particular, in some embodiments, the infographic segments comprise image files including text. By utilizing OCR, the infographic parsing system 106 can convert text or images of text into machine-encoded text that is searchable. By digitalizing printed text for each of the infographic segments, the infographic parsing system 106 can identify infographic segments that are relevant to received queries.

As illustrated in FIG. 8D, the query-response interface 840a includes an infographic segment request 850b, a query field 842 for receiving a natural language query, a submit query element 844, a textual segment 846, a natural language query 848, and an infographic segment request 850a. In at least one embodiment, the query field comprises an interactive user interface element by which a user may enter a natural language query. For example, the client device 800d may receive a natural language query based on a user entering the query and selecting the submit query element 844.

Based on receiving the natural language query, the client device 800d may update the query-response interface 840a to include the textual segment 846. Generally, the infographic parsing system 106 generates the textual segment in response to the received query. In particular, based on receiving the natural language query from the client device 800d, the infographic parsing system 106 utilizes a query-response model to identify an infographic segment from an infographic that comprises a textual segment that is relevant to the query. The infographic parsing system 106 may provide the textual segment 846 for display by the client device 800d.

As mentioned, the infographic parsing system 106 utilizes a query-response model to determine responses for queries. In at least one embodiment, the query-response model comprises a Bidirectional Encoder Representations from Transformers (BERT)-based model. Generally, the BERT-based model is a technique for natural language processing. Features of an example BERT-based model are provided in "Open Sourcing BERT: State-of-the-Art Pre-training for Natural Language Processing," Google AI Blog, https://ai.googleblog.com/2018/11/open-sourcing-bert-state-of-art-pre.html (Nov. 2, 2018), the disclosure of which is incorporated by reference herein in its entirety.

As illustrated in FIG. 8D, the query-response interface 840a also includes the infographic segment request 850a. Based on user selection of the infographic segment request 850a, the client device 800d updates the query-response interface 840a to present the infographic segment associated with the textual segment 846. FIG. 8E illustrates a query-response interface 840b displaying a digital presentation graphic 852 that includes an infographic segment 854 that contains the textual segment.

FIG. 8E illustrates the query-response interface 840b displayed on screen 802e of a client device 800e. As just mentioned, the client device 800e presents the digital presentation graphic 852 within the query-response interface 840b based on a selection of the infographic segment request 850b. As shown in FIG. 8E, the digital presentation graphic 852 includes the infographic segment 854 relevant to the query. More specifically, the infographic segment 854 contains the textual segment that responds to the natural language query.

Additionally, in one or more embodiments, the infographic parsing system 106 may utilize the digital presentation graphics and/or the infographic segments in other applications. After the infographic parsing system 106 has performed OCR, the infographic parsing system 106 may electronically edit and search infographics. For instance, in at least one embodiment, the infographic parsing system 106 digitizes graphic and text elements of infographics so that the infographic parsing system 106 can electronically edit individual elements. Furthermore, the infographic parsing system 106 can perform searches on digital presentation graphics and/or the infographic segments and present the digital presentation graphics or the infographic segments as search results. For example, the infographic parsing system 106 can present digital presentation graphics or infographic segments as search results in an internet search, a document search on a local computer, or another type of search as described herein.

As mentioned previously, the infographic parsing system 106 can generate digital presentation graphics for infographic segments. FIG. 9 and the corresponding disclosure provide details regarding how the infographic parsing system 106 generates digital presentation graphics in accordance with at least one embodiment. In some embodiments, digital presentation graphics comprise digital images that display infographic segments. For example, digital presentation graphics can comprise slides of equal dimensions that facilitate the presentation of infographic segments. As illustrated in FIG. 9, the infographic parsing system 106 performs an act 902 of receiving infographic segments and an act 904 of generating digital presentation graphics.

As illustrated in FIG. 9, the infographic parsing system 106 performs the act 902 of receiving infographic segments. In particular, the infographic segments 906a-906c comprise infographic segments generated by utilizing the machine-learning-detection model. As further illustrated, each of the infographic segments 906a-906c comprise various text and graphic elements. The borders of the infographic segments 906a-906c may be irregular, and the scale of each of the infographic segments 906a-906c is different.

As mentioned, the infographic parsing system 106 performs the act 904 of generating digital presentation graphics. In particular, the infographic parsing system 106 modifies the infographic segments 906a-906c and places them of fixed-size images to generate digital presentation graphics 908a-908c of equal dimensions. FIG. 9 illustrates example steps for performing the act 904. For instance, the infographic parsing system 106 can (i) refine borders of segment graphics, (ii) center the segment graphics onto fixed-size images, and (iii) fill the remaining pixels in the image with color.

As illustrated in FIG. 9, the infographic parsing system 106 refines the borders of infographic segments. In particular, the infographic parsing system 106 detects the boundaries of the infographic segments 906a-906c. For instance, the infographic parsing system 106 determines whether the boundaries intersect text or graphic elements (e.g., the infographic segment includes a partial text or graphic element). The infographic parsing system 106 can shift boundaries of the infographic segments 906a-906c to include all intersecting text and graphic elements within the infographic segments.

As further illustrated in FIG. 9, the infographic parsing system 106 places each of the infographic segments 906a-906c at the center of fixed-size blank images. In one embodiment, the infographic parsing system 106 determines dimensions for the fixed-size blank images based on the largest infographic segment. The infographic parsing system 106 can determine the dimensions by ensuring that the largest infographic segment fits within the dimensions of the blank image. For example, based on determining that the infographic segment 906c is the largest infographic segment, the infographic parsing system 106 determines and uses dimensions for the fixed-size blank images that are larger than or equal to the dimensions for the infographic segment 906c and of a pre-defined or default aspect ratio.

In one embodiment, as part of centering the infographic segments 906a-906c on fixed-size blank images, the infographic parsing system 106 can re-scale the infographic segments 906a-906c to fit the fixed-size blank images. In particular, the infographic parsing system 106 re-scales the infographic segments 906a-906c to preserve the aspect ratios while also maximizing the content size. For example, the infographic parsing system 106 can proportionally expand the infographic segments 906a-906b to fit the fixed-size blank images.

In some embodiments, the infographic parsing system 106 can further fill the fixed-size blank images with color. In particular, in at least one embodiment, the infographic parsing system 106 determines a dominant color of the infographic segments 906a-906c. The infographic parsing system 106 then fills the remaining pixels of the fixed-size blank images to create a consistent slide image. For example, as illustrated in FIG. 9, the infographic parsing system 106 can determine a single dominant color for all of the infographic segments 906a-906c. In at least one other embodiment, the infographic parsing system 106 determines dominant colors for each of the infographic segments 906a-906c and fills the resulting pixels of the corresponding fixed-size images with the individual dominant colors.

Figure 10:
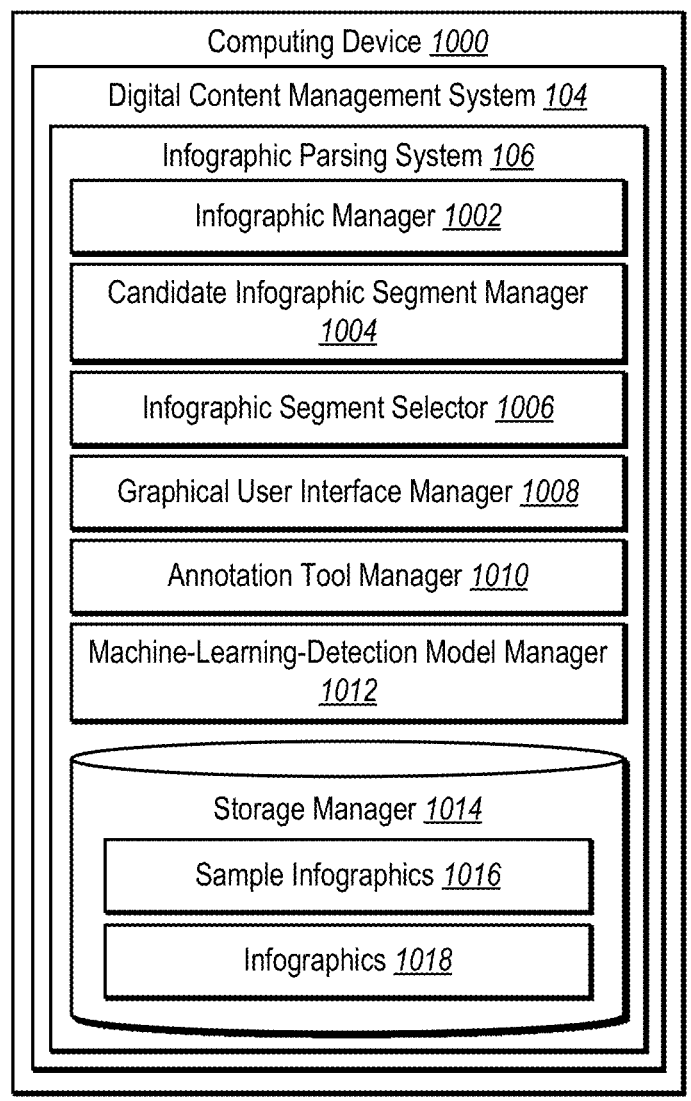
FIG. 10 illustrates a schematic diagram of an example architecture of the infographic parsing system in accordance with one or more embodiments of the present disclosure.

FIG. 10 illustrates a schematic diagram of components of the infographic parsing system 106 in accordance with one or more embodiments. As shown, the infographic parsing system 106 can be implemented by a computing device 1000 (e.g., the server device(s) 102, the user client device 108, and/or the administrator client device 116). Additionally, the infographic parsing system 106 can be part of the digital content management system 104. The infographic parsing system 106 can include, but is not limited to an infographic manager 1002, a candidate infographic segment manager 1004, an infographic segment selector 1006, a graphical user interface manager 1008, an annotation tool manager 1010, a machine-learning-detection model manager 1012, and a storage manager 1014. The infographic parsing system 106 can be implemented as part of the digital content management system 104 in a distributed system of the server devices for managing digital content. Alternatively, the infographic parsing system 106 can be implemented on a single computing device such as the user client device 108 of FIG. 1.

In one or more embodiments, each of the components of the infographic parsing system 106 are in communication with one another using any suitable communication technologies. Additionally, the components of the infographic parsing system 106 can be in communication with one or more other devices including the user client device 108 and/or the administrator client device 116 as illustrated in FIG. 1. Although the components of the infographic parsing system 106 are shown as separate in FIG. 10, any of the subcomponents may be combined into fewer components, such as into a single component or divided into more components as may serve a particular implementation. Furthermore, although the components of FIG. 10 are described in connection with the infographic parsing system 106, at least some of the components for performing operations in conjunction with the infographic parsing system 106 described herein may be implemented on other devices within the environment.

The components of the infographic parsing system 106 can include software, hardware, or both. For example, the components of the infographic parsing system 106 can include one or more instructions stored on a computer-readable storage medium and executable by processors of one or more computing devices (e.g., the user client device 108 and/or the administrator client device 116). When executed by the one or more processors, the computer-executable instructions of the infographic parsing system 106 can cause the computing devices to perform the infographic parsing methods described herein. Alternatively, the components of the infographic parsing system 106 can comprise hardware, such as a special purpose processing device to perform a certain function or group of functions. Additionally, or alternatively, the components of the infographic parsing system 106 can include a combination of computer-executable instructions and hardware.

Furthermore, the components of the infographic parsing system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the infographic parsing system 106 may be implemented as part of a stand-alone application on a personal computing device or a mobile device. Alternatively or additionally, the components of the infographic parsing system 106 may be implemented in any application that allows creation and delivery of marketing content to users, including, but not limited to, applications in ADOBE® DOCUMENT CLOUD®, such as ACROBAT®, ADOBE® FILL & SIGN, ADOBE® SPARK, ADOBE® ILLUSTRATOR, ADOBE® XD, and ADOBE® EXPERIENCE MANAGER. "ADOBE", "ILLUSTRATOR", and "ADOBE CREATIVE CLOUD" are registered trademarks of Adobe Inc. in the United States and/or other countries.

As shown in FIG. 10, the infographic parsing system 106 includes the infographic manager 1002. The infographic manager 1002 receives, stores, analyzes, and manages infographics. In particular, the infographic manager 1002 manages infographics that the machine-learning-detection model will analyze during application. Furthermore, the infographic manager 1002 can store and manage data related to infographic segments associated with the infographics. In particular, the infographic manager 1002 stores and manages location data (e.g., coordinates) corresponding to infographic segments and segment-confidence values. Furthermore, the infographic manager 1002 can manage and store data relating to infographic frames.

As further illustrated in FIG. 10, the infographic parsing system 106 includes the candidate infographic segment manager 1004. In particular, the candidate infographic segment manager 1004 receives, stores, analyzes, and manages candidate infographic segments. In particular, the candidate infographic segment manager 1004 can receive candidate infographic segments from the machine-learning-detection model. More specifically, the candidate infographic segment manager 1004 stores data including segment-confidence values corresponding to each of the candidate infographic segments.

The infographic parsing system 106 also includes the infographic segment selector 1006. Generally, the infographic segment selector 1006 analyzes segment-confidence values corresponding to each of the candidate infographic segments and selects infographic segments. For instance, in at least one embodiment, the infographic segment selector 1006 simply identifies candidate infographic segments having the highest segment-confidence values as the infographic segments.

As illustrated in FIG. 10, the infographic parsing system 106 includes the graphical user interface manager 1008. The graphical user interface manager 1008 generates, modifies, and manages graphical user interfaces provided by the infographic parsing system 106. Generally, the graphical user interface manager 1008 provides graphical user interface elements and features for display at a client device. The graphical user interface manager 1008 also receives user input via the client device. For instance, the graphical user interface manager 1008 generates and manages the annotation graphical user interface for generating ground-truth annotations and ground-truth location identifiers. Additionally, the graphical user interface manager 1008 generates and manages user interfaces involved in downstream applications. For instance, the graphical user interface manager 1008 manages graphical user interfaces provided during use of the query-response model.

As further illustrated in FIG. 10, the infographic parsing system 106 also includes the annotation tool manager 1010. Generally, the annotation tool manager 1010 generates, manages, analyzes, and stores data relating to associating ground-truth annotations with elements of sample infographics for training the machine-learning-detection model. More particularly, the annotation tool manager 1010 can store annotation labels and send the annotation labels to the graphical user interface manager 1008 for display at a client device. The annotation tool manager 1010 can also generate text and graphic bounding boxes for sample infographics to provide to the user. The annotation tool manager also generates a list hierarchy that indicates a data structure corresponding to ground-truth annotations.

As further illustrated in FIG. 10, the infographic parsing system 106 also includes the machine-learning-detection model manager 1012. The machine-learning-detection model manager 1012 stores, trains, and applies the various machine learning models utilized by the infographic parsing system 106. In particular, the machine-learning-detection model manager 1012 trains and applies the machine-learning-detection model. During training, the machine-learning-detection model manager 1012 communicates with the storage manager 1014 to retrieve training data including sample infographics and ground-truth data (e.g., ground-truth annotations and ground-truth location identifiers). The machine-learning-detection model manager 1012 adjusts parameters of the machine-learning-detection model to reduce loss. During application, the machine-learning-detection model manager 1012 accesses infographics to utilize as input into the machine-learning-detection model. The machine-learning-detection model manager 1012 also communicates output infographic segments to the infographic parsing system 106.

As further illustrated in FIG. 10, the infographic parsing system 106 also includes the storage manager 1014. The storage manager 1014 stores (via one or more memory devices) the sample infographics 1016 and the infographics 1018. The sample infographics 1016 include a repository of infographics of various categories, types, styles, organizations, etc. used to train the machine-learning-detection model. More particularly, the sample infographics 1016 also include training data such as ground-truth annotations and ground-truth location identifiers corresponding to the sample infographics 1016.

As further illustrated in FIG. 10, the storage manager 1014 also includes the infographics 1018. The infographics 1018 include infographics received from a client device (e.g., the user client device 108 and/or the administrator client device 116). In particular, the infographics 1018 include infographics to which the infographic parsing system 106 will apply the machine-learning-detection model. Additionally, the storage manager 1014 stores, with the infographics 1018, data relating to identified infographic segments. For instance, the storage manager 1014 can store digital presentation graphics.

FIG. 10 illustrates an example embodiment displaying components of the infographic parsing system 106. In one or more embodiments, the infographic parsing system 106 can include additional components. For instance, though not illustrated, the infographic parsing system 106 may include a digital presentation graphics generator. In particular, the digital presentation graphics generator can access infographic segments and utilize the infographic segments to create digital presentation graphics.

Additionally, though not illustrated in FIG. 10, the infographic parsing system 106 can also include a downstream application manager. For instance, the downstream application manager can store, manage, and apply any downstream application as described herein. In particular, the downstream application manager can manage a query-response model as described herein. For instance, the downstream application manager can manage user input including queries, perform search functions on infographic segments, and generate relevant responses.

Figure 11:
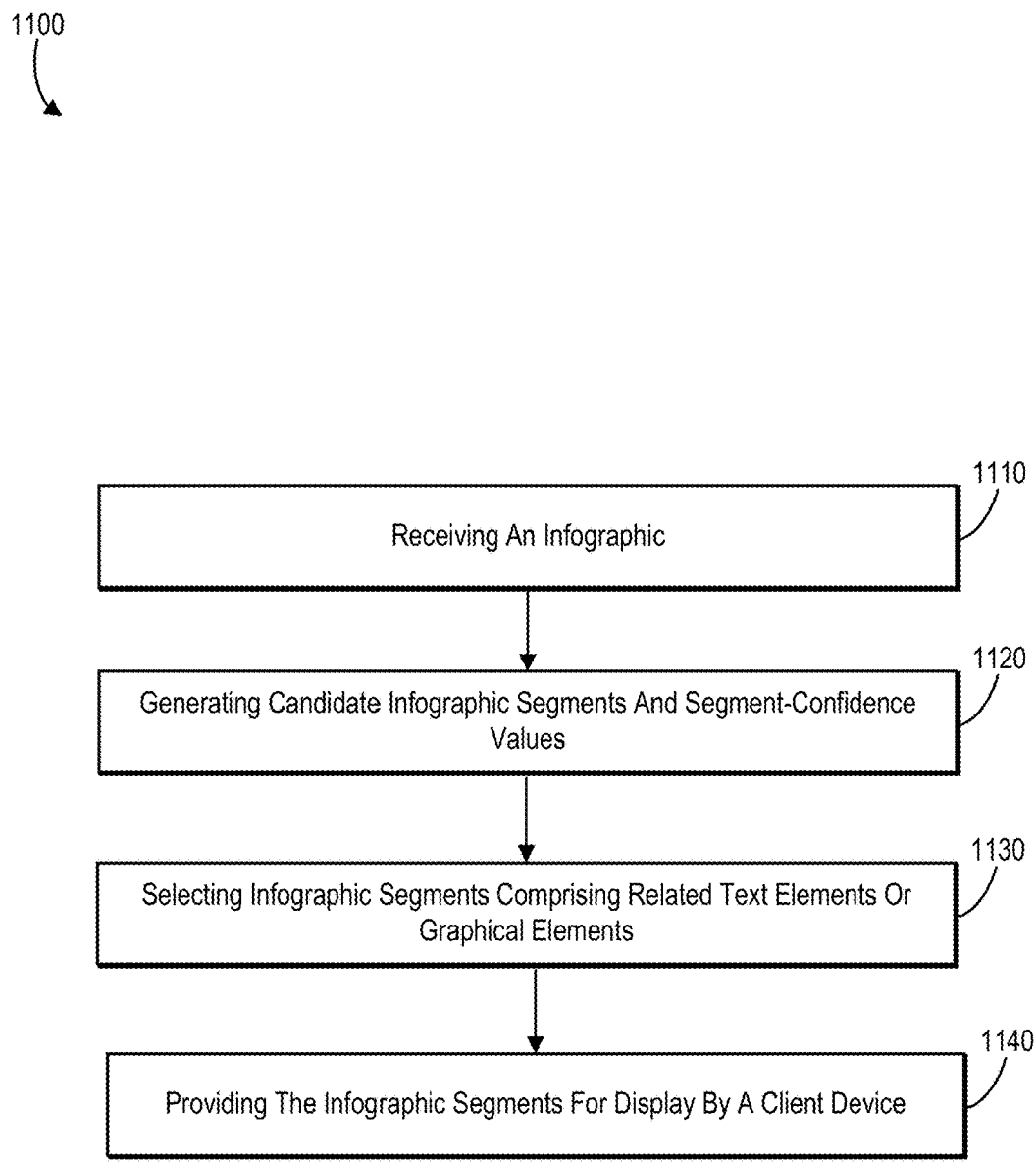
FIG. 11 illustrates a series of acts for generating infographic segments and providing the infographic segments for display by a client device in accordance with one or more embodiments of the present disclosure.

FIG. 11 illustrates a flowchart of a method for determining infographic segments and providing the infographic segments for display. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions that, when executed by one or more processors, cause the computing device to perform the acts of FIG. 11. In still further embodiments, a system can perform the acts of FIG. 11.

As shown in FIG. 11, the series of acts 1100 includes an act 1110 of receiving an infographic. In particular, the act 1110 comprises receiving an infographic comprising text elements and graphic elements.

The series of acts 1100 includes an act 1120 of generating candidate infographic segments and segment-confidence values. In particular, the act 1120 comprises generating, from the infographic utilizing a machine-learning-detection model, candidate infographic segments comprising one or more text elements or graphic elements and segment-confidence values indicating a probability that particular candidate infographic segments comprise discrete components from the infographic corresponding to a list or a group. The act 1120 can further comprise an act of generating the candidate infographic segments by: partitioning the infographic into overlapping infographic frames; and identifying, utilizing the machine-learning-detection model, proposed boxes within the overlapping infographic frames comprising the one or more text elements or graphic elements. Furthermore, the act 1120 can comprise an act of generating particular segment-confidence values indicating the probability that a particular candidate infographic segment comprises discrete components from the infographic by generating a set of segment-confidence values indicating a set of probabilities that the particular candidate infographic segment comprises a list or a group of particular text elements or graphic elements according to an infographic grouping taxonomy.

The series of acts 1100 also includes an act 1130 of selecting infographic segments comprising related text elements or graphical elements. In particular, the act 1130 comprises based on the segment-confidence values, selecting, from the candidate infographic segments utilizing the machine-learning-detection model, infographic segments comprising one or more of related text elements or graphic elements corresponding to particular lists or particular groups within the infographic. The act 1130 can comprise an act of selecting the infographic segments by performing non-maximal suppression on the candidate infographic segments to identify a set of candidate infographic segments corresponding to a set of highest segment-confidence values. Similarly, the act 1130 can comprise performing non-maximal suppression on the candidate infographic segments to identify a set of non-overlapping candidate infographic segments corresponding to a set of highest segment-confidence values across the overlapping infographic frames.

As further shown in FIG. 11, the series of acts 1100 includes an act 1140 of providing the infographic segments for display by the client device. In particular, the act 1140 comprises providing the infographic segments for display by the computing device. The act 1140 can further comprise an act of providing the infographic segments for display by a client device by converting the infographic segments into digital presentation graphics. In certain implementations, converting the infographic segments into the digital presentation graphics comprises: centering each of the infographic segments on fixed-size blank images; and filling remaining pixels on the fixed-size blank images using a dominant color corresponding to the infographic segments.

In one or more embodiments, the series of acts 1100 includes additional acts of receiving, from a client device, a query for information; identifying, utilizing a query-response model, an infographic segment from among the infographic segments comprising a textual segment relevant to the query; and providing, for display by the client device, the textual segment from the infographic segment in response to the query. Similarly, the series of acts 1100 can include providing, for display by a client device, a query field for natural language queries; receiving, from the client device, a natural language query via the query field; identifying, utilizing a query-response model, an infographic segment from among the infographic segments comprising a textual segment relevant to the query; and providing, for display by the client device, the textual segment from the infographic segment in response to the natural language query. Furthermore, the additional acts can comprise receiving, from the client device, a source query to identify a source of the textual segment; and based on receiving the source query, providing, for display by the client device, the infographic segment comprising the textual segment.

In certain cases, the series of acts 1100 further includes tuning the machine-learning-detection model by: partitioning a sample infographic into overlapping sample infographic frames; generating, from the overlapping sample infographic frames utilizing the machine-learning-detection model, candidate segments and predicted segment-confidence values indicating a probability that particular candidate segments comprise discrete components from the sample infographic according to an infographic grouping taxonomy; based on the candidate segments and the predicted segment-confidence values, selecting predicted infographic segments comprising predicted annotations; comparing the annotations to one or more ground-truth annotations for the sample infographic identifying ground-truth lists or groups of sample text elements or sample graphic elements within the predicted infographic segments according to the infographic grouping taxonomy; and modifying machine-learning parameters of the machine-learning-detection model based on one or more determined losses between the predicted annotations and the ground-truth annotations.

Similarly, in some embodiments, the series of acts 1100 further includes partitioning a sample infographic into overlapping sample infographic frames; generating, from the overlapping sample infographic frames and utilizing the machine-learning-detection model, candidate segments and predicted segment-confidence values indicating a probability that particular candidate segments comprise discrete components from the sample infographic according to an infographic grouping taxonomy; based on the candidate segments and the predicted segment-confidence values, determining predicted infographic segments comprising predicted location identifiers identifying locations of the predicted infographic segments within the sample infographic and predicted annotations identifying predicted lists or groups of sample text elements or sample graphic elements within the predicted infographic segments; comparing the predicted location identifiers to ground-truth location identifiers for the sample infographic and the predicted annotations to ground-truth annotations for the sample infographic identifying ground-truth lists or groups of sample text elements or sample graphic elements within the predicted infographic segments according to the infographic grouping taxonomy; and modifying machine-learning parameters of the machine-learning-detection model based on a first set of losses between the predicted location identifiers and the ground-truth location identifiers and a second set of losses between the predicted annotations and the ground-truth annotations.

Relatedly, in some cases, the series of acts 1100 further includes providing, for display within a graphical user interface of a client device, the sample infographic and annotation labels according to the infographic grouping taxonomy; and receiving, from the client device via the graphical user interface, an association of particular annotations as the ground-truth annotations according to the infographic grouping taxonomy. Additionally, the series of acts 1100 can further include generating a nested list and a group structure comprising the particular annotations; and providing, for display within the graphical user interface of the client device, the nested list and the group structure. In some implementations, receiving the association of the particular annotations from the client device comprises: receiving an indication of a user selection of one or more text bounding boxes and graphic bounding boxes within the sample infographic; and receiving a user selection of an annotation label from the annotation labels; and associating the annotation label with the one or more text bounding boxes and the graphic bounding boxes.

As indicated above, in certain implementations, the series of acts 1100 further includes determining the first set of losses between the predicted location identifiers and the ground-truth location identifiers by determining localization losses representing differences in location between the predicted location identifiers and the ground-truth location identifiers; determining the second set of losses between the predicted annotations and the ground-truth annotations by determining classification losses based on comparisons between the predicted annotations and the ground-truth annotations for the sample infographic; determining weighted sums of the localization losses and the classification losses; and modifying the machine-learning parameters of the machine-learning-detection model based the weighted sums.

In addition (or in the alternative) to the acts described above, in some embodiments, the infographic parsing system 106 performs a step for generating infographic segments from the infographic utilizing a machine-learning-detection model. For example, the acts described in reference to FIG. 7 can comprise the corresponding acts (or algorithm) for performing a step for generating infographic segments from the infographic utilizing a machine-learning-detection model.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. Cloud computing is a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
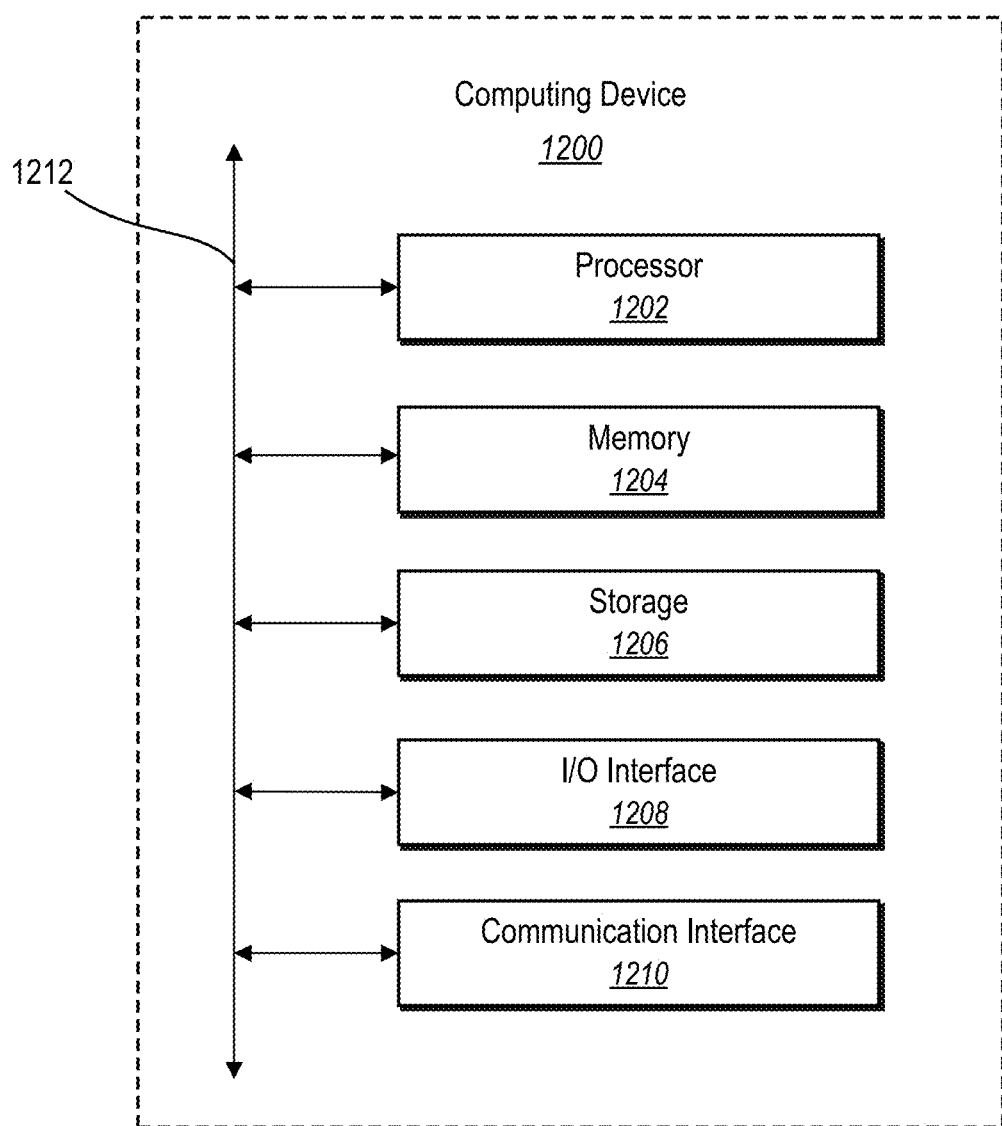
FIG. 12 illustrates a block diagram of an example computing device in accordance with one or more embodiments of the present disclosure.

FIG. 12 illustrates a block diagram of a computing device 1200 that may be configured to perform one or more of the processes described above. One will appreciate that one or more computing devices such as the computing device 1200 may implement the digital content management system 104 and the infographic parsing system 106. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A non-transitory computer readable medium storing executable instructions that, when executed by a processing device, cause the processing device to perform operations comprising:

receiving an infographic comprising text elements and graphic elements;

accessing a machine-learning-detection model trained with annotation labels according to an infographic grouping taxonomy;

generating, from the infographic utilizing the machine-learning-detection model, candidate infographic segments;

generating, utilizing the machine-learning-detection model, segment-confidence values indicating a probability that particular candidate infographic segments comprise discrete components from the infographic corresponding to a list or a group, the discrete components each comprising one or more of related text elements and graphic elements according to the infographic grouping taxonomy;

based on the segment-confidence values, selecting, from the candidate infographic segments utilizing the machine-learning-detection model, infographic segments comprising one or more of related text elements and graphic elements together as a discrete component, the infographic segments corresponding to particular lists or particular groups within the infographic; and providing the infographic segments for display by the processing device.

2. The non-transitory computer readable medium as recited in claim 1, further comprising instructions that, when executed by the processing device, cause the processing device to generate the candidate infographic segments by:

partitioning the infographic into overlapping infographic frames; and identifying, utilizing the machine-learning-detection model, proposed boxes within the overlapping infographic frames comprising the one or more of text elements and graphic elements.

3. The non-transitory computer readable medium as recited in claim 1, further comprising instructions that, when executed by the processing device, cause the processing device to generate particular segment-confidence values indicating the probability that a particular candidate infographic segment comprises discrete components from the infographic by generating a set of segment-confidence values indicating a set of probabilities that the particular candidate infographic segment comprises a list or a group of particular text elements or graphic elements according to an infographic grouping taxonomy.

4. The non-transitory computer readable medium as recited in claim 1, further comprising instructions that, when executed by the processing device, cause the processing device to select the infographic segments by performing non-maximal suppression on the candidate infographic segments to identify a set of candidate infographic segments corresponding to a set of highest segment-confidence values.

5. The non-transitory computer readable medium as recited in claim 1, further comprising instructions that, when executed by the processing device, cause the processing device to provide the infographic segments for display by the processing device by converting the infographic segments into digital presentation graphics.

6. The non-transitory computer readable medium as recited in claim 1, further comprising instructions that, when executed by the processing device, cause the processing device to:

receive, from a client device, a query for information;

identify, utilizing a query-response model, an infographic segment from among the infographic segments comprising a textual segment relevant to the query; and provide, for display by the client device, the textual segment from the infographic segment in response to the query.

7. The non-transitory computer readable medium as recited in claim 6, further comprising instructions that, when executed by the processing device, cause the processing device to:

receive, from the client device, a source query to identify a source of the textual segment; and based on receiving the source query, provide, for display by the client device, the infographic segment comprising the textual segment.

8. The non-transitory computer readable medium as recited in claim 1, further comprising instructions that, when executed by the processing device, cause the processing device to tune the machine-learning-detection model by:

partitioning a sample infographic into overlapping sample infographic frames;

generating, from the overlapping sample infographic frames utilizing the machine-learning-detection model, candidate segments and predicted segment-confidence values indicating a probability that particular candidate segments comprise discrete components from the sample infographic according to an infographic grouping taxonomy;

based on the candidate segments and the predicted segment-confidence values, selecting predicted infographic segments comprising predicted annotations;

comparing the predicted annotations to one or more ground-truth annotations for the sample infographic identifying ground-truth lists or groups of sample text elements or sample graphic elements within the predicted infographic segments according to the infographic grouping taxonomy; and modifying machine-learning parameters of the machine-learning-detection model based on one or more determined losses between the predicted annotations and the one or more ground-truth annotations.

9. A system comprising:

a memory component comprising a machine-learning-detection model trained with annotation labels according to an infographic grouping taxonomy, and an infographic including text elements and graphic elements; and one or more processing devices coupled to the memory component, the one or more processing devices to perform operations comprising:

partitioning the infographic into overlapping infographic frames;

generating, from the overlapping infographic frames utilizing the machine-learning-detection model, candidate infographic segments;

generating, utilizing the machine-learning-detection model, segment-confidence values indicating probabilities that particular candidate infographic segments from the candidate infographic segments comprise discrete components from the infographic corresponding to a list or a group, the discrete components each comprising one or more of related text elements and graphic elements according to the infographic grouping taxonomy;

based on the segment-confidence values, selecting, from the candidate infographic segments utilizing the machine-learning-detection model, infographic segments comprising one or more of related text elements and graphic elements together as a discrete component, the infographic segments corresponding to particular lists or particular groups within the infographic; and converting, for display on a graphical user interface of a client device, the infographic segments into digital presentation graphics.

10. The system as recited in claim 9, wherein the one or more processing devices is configured to select the infographic segments by performing non-maximal suppression on the candidate infographic segments to identify a set of non-overlapping candidate infographic segments corresponding to a set of highest segment-confidence values across the overlapping infographic frames.

11. The system as recited in claim 9, wherein the one or more processing devices is configured to convert the infographic segments into the digital presentation graphics by:

centering each of the infographic segments on fixed-size blank images; and filling remaining pixels on the fixed-size blank images using a dominant color corresponding to the infographic segments.

12. The system as recited in claim 9, wherein the one or more processing devices is configured to:

provide, for display by a client device, a query field for natural language queries;

receive, from the client device, a natural language query via the query field;

identify, utilizing a query-response model, an infographic segment from among the infographic segments comprising a textual segment relevant to the natural language query; and provide, for display by the client device, the textual segment from the infographic segment in response to the natural language query.

13. The system as recited in claim 9, wherein the one or more processing devices is further configured to:

partition a sample infographic into overlapping sample infographic frames;

generate, from the overlapping sample infographic frames and utilizing the machine-learning-detection model, candidate segments and predicted segment-confidence values indicating a probability that particular candidate segments comprise discrete components from the sample infographic according to an infographic grouping taxonomy;

based on the candidate segments and the predicted segment-confidence values, determine predicted infographic segments comprising predicted location identifiers identifying locations of the predicted infographic segments within the sample infographic and predicted annotations identifying predicted lists or groups of sample text elements or sample graphic elements within the predicted infographic segments;

compare the predicted location identifiers to ground-truth location identifiers for the sample infographic and the predicted annotations to ground-truth annotations for the sample infographic identifying ground-truth lists or groups of sample text elements or sample graphic elements within the predicted infographic segments according to the infographic grouping taxonomy; and modify machine-learning parameters of the machine-learning-detection model based on a first set of losses between the predicted location identifiers and the ground-truth location identifiers and a second set of losses between the predicted annotations and the ground-truth annotations.

14. The system as recited in claim 13, wherein the one or more processing devices is further configured to:

provide, for display within a graphical user interface of a client device, the sample infographic and the annotation labels according to the infographic grouping taxonomy; and receive, from the client device via the graphical user interface, an association of particular annotations as the ground-truth annotations according to the infographic grouping taxonomy.

15. The system as recited in claim 14, wherein the one or more processing devices is further configured to:

generate a nested list and a group structure comprising the particular annotations; and provide, for display within the graphical user interface of the client device, the nested list and the group structure.

16. The system as recited in claim 14, wherein the one or more processing devices is configured to receive the association of the particular annotations from the client device by:

receiving an indication of a user selection of one or more text bounding boxes and graphic bounding boxes within the sample infographic;

receiving a user selection of an annotation label from the annotation labels; and associating the annotation label with the one or more text bounding boxes and the graphic bounding boxes.

17. The system as recited in claim 13, wherein the one or more processing devices is configured to:

determine the first set of losses between the predicted location identifiers and the ground-truth location identifiers by determining localization losses representing differences in location between the predicted location identifiers and the ground-truth location identifiers;

determine the second set of losses between the predicted annotations and the ground-truth annotations by determining classification losses based on comparisons between the predicted annotations and the ground-truth annotations for the sample infographic;

determine weighted sums of the localization losses and the classification losses; and modify the machine-learning parameters of the machine-learning-detection model based the weighted sums.

18. A method comprising:

receiving an infographic comprising text elements and graphic elements;

accessing a machine-learning-detection model trained with annotation labels according to an infographic grouping taxonomy;

generating, from the infographic utilizing the machine-learning-detection model, candidate infographic segments;

generating, utilizing the machine-learning-detection model, segment-confidence values indicating a probability that particular candidate infographic segments comprise discrete components from the infographic corresponding to a list or a group, the discrete components each comprising one or more of related text elements and graphic elements according to the infographic grouping taxonomy;

based on the segment-confidence values, selecting, from the candidate infographic segments utilizing the machine-learning-detection model, infographic segments comprising one or more of related text elements and graphic elements together as a discrete component, the infographic segments corresponding to particular lists or particular groups within the infographic; and providing the infographic segments for display by a processing device.

19. The method as recited in claim 18, wherein providing the infographic segments for display by the processing device comprises converting the infographic segments into digital presentation graphics.

20. The method as recited in claim 18, further comprising:

receiving, from a client device, a query of information;

identifying, utilizing a query-response model, an infographic segment from among the infographic segments comprising a textual segment relevant to the query; and providing, for display by the client device, the textual segment from the infographic segment in response to the query.

* * * * *